(12) United States Patent
Nakamura et al.

(10) Patent No.: US 12,002,231 B2
(45) Date of Patent: Jun. 4, 2024

(54) COMMUNICATION SYSTEM, METHOD FOR COMMUNICATING TO SHARE IMAGES, AND NON-TRANSITORY RECORDING MEDIUM

(71) Applicants: Shigeru Nakamura, Kanagawa (JP); Yuichi Kawasaki, Kanagawa (JP); Hiroshi Hinohara, Kanagawa (JP); Takeshi Homma, Hyogo (JP)

(72) Inventors: Shigeru Nakamura, Kanagawa (JP); Yuichi Kawasaki, Kanagawa (JP); Hiroshi Hinohara, Kanagawa (JP); Takeshi Homma, Hyogo (JP)

(73) Assignee: RICOH COMPANY, LTD., Tokyo (JP)

( * ) Notice: Subject to any disclaimer, the term of this patent is extended or adjusted under 35 U.S.C. 154(b) by 403 days.

(21) Appl. No.: 17/391,029

(22) Filed: Aug. 2, 2021

(65) Prior Publication Data

US 2022/0044431 A1    Feb. 10, 2022

(30) Foreign Application Priority Data

Aug. 4, 2020 (JP) ................................. 2020-132639

(51) Int. Cl.
*G06T 7/90* (2017.01)
*G06T 3/4038* (2024.01)
(Continued)

(52) U.S. Cl.
CPC ............. *G06T 7/55* (2017.01); *G06T 3/4038* (2013.01); *G06T 7/90* (2017.01)

(58) Field of Classification Search
CPC ........... G06T 7/55; G06T 7/90; G06T 3/4038; H04N 7/147; H04N 7/15; H04L 12/1827;
(Continued)

(56) References Cited

U.S. PATENT DOCUMENTS

2007/0198534 A1   8/2007  Hon et al.
2012/0206471 A1   8/2012  Sarnoff et al.
(Continued)

FOREIGN PATENT DOCUMENTS

JP   2015-060592   3/2015
JP   2018-093361   6/2018

OTHER PUBLICATIONS

Extended European Search Report dated Dec. 13, 2021 in European Patent Application No. 21188149.5, 8 pages.
(Continued)

*Primary Examiner* — Syed Haider
(74) *Attorney, Agent, or Firm* — XSENSUS LLP

(57) ABSTRACT

A communication system includes a first communication terminal and a second communication terminal that shares a plurality of images with the first communication terminal. The first communication terminal includes first circuitry that receives a change of a display order of the plurality of images displayed on a display of the first communication terminal; and transmit information regarding the changed display order of the plurality of images to the second communication terminal. The second communication terminal includes second circuitry to change the display order of the plurality of images displayed on a display of the second communication terminal in accordance with the information regarding the display order of the plurality of images received from the first communication terminal. A method for communicating, performed by a communication terminal, the communication terminal, and a non-transitory recording medium executing the method for communicating are provided.

11 Claims, 23 Drawing Sheets

(51) Int. Cl.
*G06T 7/55* (2017.01)
*H04N 7/15* (2006.01)

(58) Field of Classification Search
CPC .. H04L 12/1822; H04M 3/567; H04M 7/0027
See application file for complete search history.

(56) References Cited

U.S. PATENT DOCUMENTS

| | | |
|---|---|---|
| 2012/0235934 A1 | 9/2012 | Kawasaki et al. |
| 2013/0321306 A1 | 12/2013 | Bauermeister et al. |
| 2015/0035782 A1 | 2/2015 | Kawasaki et al. |
| 2015/0256793 A1* | 9/2015 | Pycock ............... H04L 12/1822 348/14.07 |
| 2015/0309765 A1* | 10/2015 | Nagahara ............. H04M 3/567 345/2.2 |
| 2017/0344248 A1 | 11/2017 | Oikawa et al. |
| 2018/0013503 A1 | 1/2018 | Nagase et al. |
| 2018/0016085 A1 | 1/2018 | Ayako et al. |
| 2018/0124137 A1* | 5/2018 | Kato .................. H04L 65/1089 |
| 2018/0146016 A1* | 5/2018 | Lieb ..................... H04L 65/403 |
| 2018/0160076 A1 | 6/2018 | Ozaki |
| 2018/0203568 A1 | 7/2018 | Kawasaki |
| 2018/0288112 A1 | 10/2018 | Miyamoto et al. |
| 2018/0300543 A1 | 10/2018 | Kawasaki et al. |
| 2018/0367758 A1 | 12/2018 | Shiro et al. |
| 2019/0034154 A1 | 1/2019 | Nakamura |
| 2019/0065041 A1 | 2/2019 | Nakamura et al. |
| 2019/0286255 A1 | 9/2019 | Kawasaki |
| 2020/0296146 A1 | 9/2020 | Hinohara et al. |
| 2020/0341631 A1 | 10/2020 | Nakamura et al. |
| 2021/0055904 A1 | 2/2021 | Hinohara et al. |
| 2021/0092170 A1 | 3/2021 | Takahashi et al. |
| 2021/0126955 A1 | 4/2021 | Nagaoka et al. |
| 2021/0133055 A1 | 5/2021 | Nakamura et al. |

OTHER PUBLICATIONS

U.S. Appl. No. 16/935,211, filed Jul. 22, 2020, Yuichi Kawasaki, et al.

\* cited by examiner

FIG. 7

| TERMINAL ID | PASSWORD |
|---|---|
| 01aa | aaaa |
| 01ab | abab |
| 01ba | baba |
| ... | ... |

FIG. 8

| TERMINAL ID | DESTINATION NAME | OPERATING STATUS | RECEPTION TIME AND DATE | IP ADDRESS OF TERMINAL |
|---|---|---|---|---|
| 01aa | JAPAN, TOKYO OFFICE, TERMINAL AA | ONLINE (COMMUNICATION ENABLED) | 20xx.4.10.13:40 | 1.2.1.3 |
| 01ab | JAPAN, TOKYO OFFICE, MR. AB | ONLINE (COMMUNICATION BEING EXECUTED) | 20xx.4.09.12:00 | 1.2.1.4 |
| 01ac | JAPAN, TOKYO OFFICE, MR. AC | OFFLINE | 20xx.4.09.12:30 | 1.2.1.5 |
| ... | ... | ... | ... | ... |
| 01ba | CHINA, BEIJING OFFICE, TERMINAL BA | ONLINE (COMMUNICATION ENABLED) | 20xx.4.10.13:45 | 1.2.2.3 |
| 01bb | CHINA, BEIJING OFFICE, MR. BB | ONLINE (SUSPENDED) | 20xx.4.10.13:50 | 1.2.2.4 |
| ... | ... | ... | ... | ... |
| 01ca | USA, WASHINGTON, D.C. OFFICE, TERMINAL CA | OFFLINE | 20xx.4.10.12:45 | 1.3.1.3 |
| 01cb | USA, WASHINGTON, D.C. OFFICE, MR. CB | OFFLINE (COMMUNICATION BEING EXECUTED) | 20xx.4.10.13:55 | 1.3.1.4 |
| ... | ... | ... | ... | ... |
| 01da | EUROPE, BERLIN OFFICE, TERMINAL DA | ONLINE (COMMUNICATION BEING EXECUTED) | 20xx.4.08.12:45 | 1.3.2.3 |
| 01db | EUROPE, BERLIN OFFICE, MR. DB | ONLINE (COMMUNICATION ENABLED) | 20xx.4.10.12:45 | 1.3.2.4 |
| ... | ... | ... | ... | ... |

| SOURCE TERMINAL ID | DESTINATION TERMINAL ID |
|---|---|
| 01aa | 01ab, ⋯, 01ba, 01bb, ⋯, 01ca, 01cb, 01da, 01db, ⋯ |
| 01ab | 01aa, 01ca, 01cb, 01da |
| ⋯ | ⋯ |
| 01ba | 01aa, 01ab, 01ca, 01cb, 01da, 01db |
| 01da | 01aa, 01ab, 01ba, ⋯, 01ca, 01cb, ⋯, 01db |

| SESSION ID | RELAY DEVICE ID | SOURCE TERMINAL ID | DESTINATION TERMINAL ID | DELAY TIME | DELAY INFORMATION RECEPTION TIME AND DATE |
|---|---|---|---|---|---|
| se01 | 111a | 01aa | 01db | 200 | 20xx.4.10.13:41 |
| se2 | 111a | 01ba | 01cb | 50 | 20xx.4.10.12:01 |
| ⋯ | ⋯ | ⋯ | ⋯ | ⋯ | ⋯ |

| RELAY DEVICE ID | OPERATING STATUS | RECEPTION TIME AND DATE | IP ADDRESS OF RELAY DEVICE | MAXIMUM DATA TRANSMISSION RATE (Mbps) |
|---|---|---|---|---|
| 111a | ONLINE | 20xx.4.10.12:00 | 1.2.1.2 | 100 |
| 111b | OFFLINE | 20xx.4.10.15:10 | 1.2.2.2 | 1000 |
| 111c | ONLINE | 20xx.4.10.15:20 | 1.3.1.2 | 100 |
| 111d | ONLINE | 20xx.4.10.15:30 | 1.3.2.2 | 10 |

| STATUS | TERMINAL ID | DESTINATION NAME |
|---|---|---|
| 📞 | 01ab | JAPAN, TOKYO OFFICE, TERMINAL AB |
| 📞 | 01ac | JAPAN, TOKYO OFFICE, MR. AC |
| ⋮ | ⋮ | ⋮ |
| 📞 | 01db | EUROPE, BERLIN OFFICE, MR. DB |
| ⋮ | ⋮ | ⋮ |

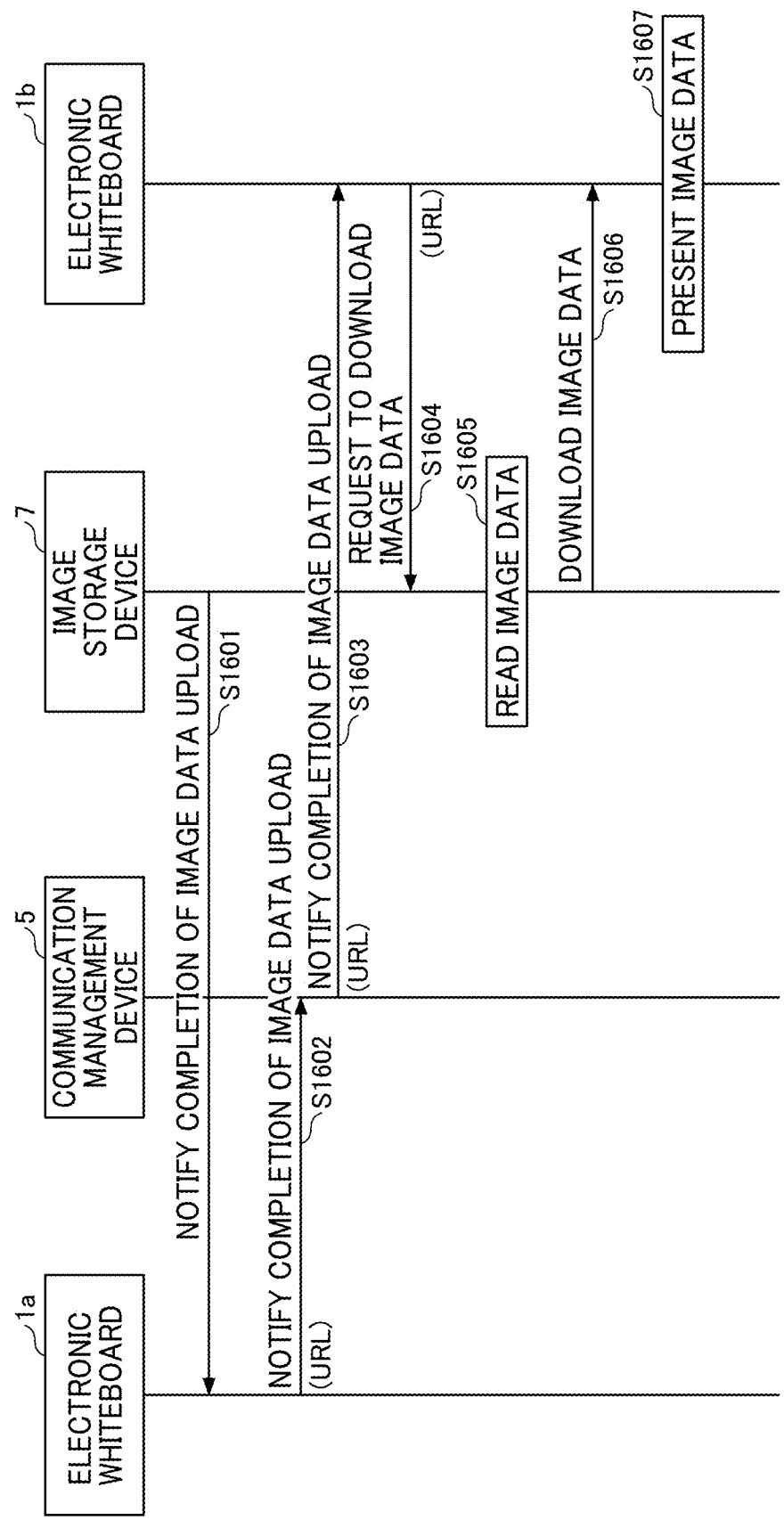

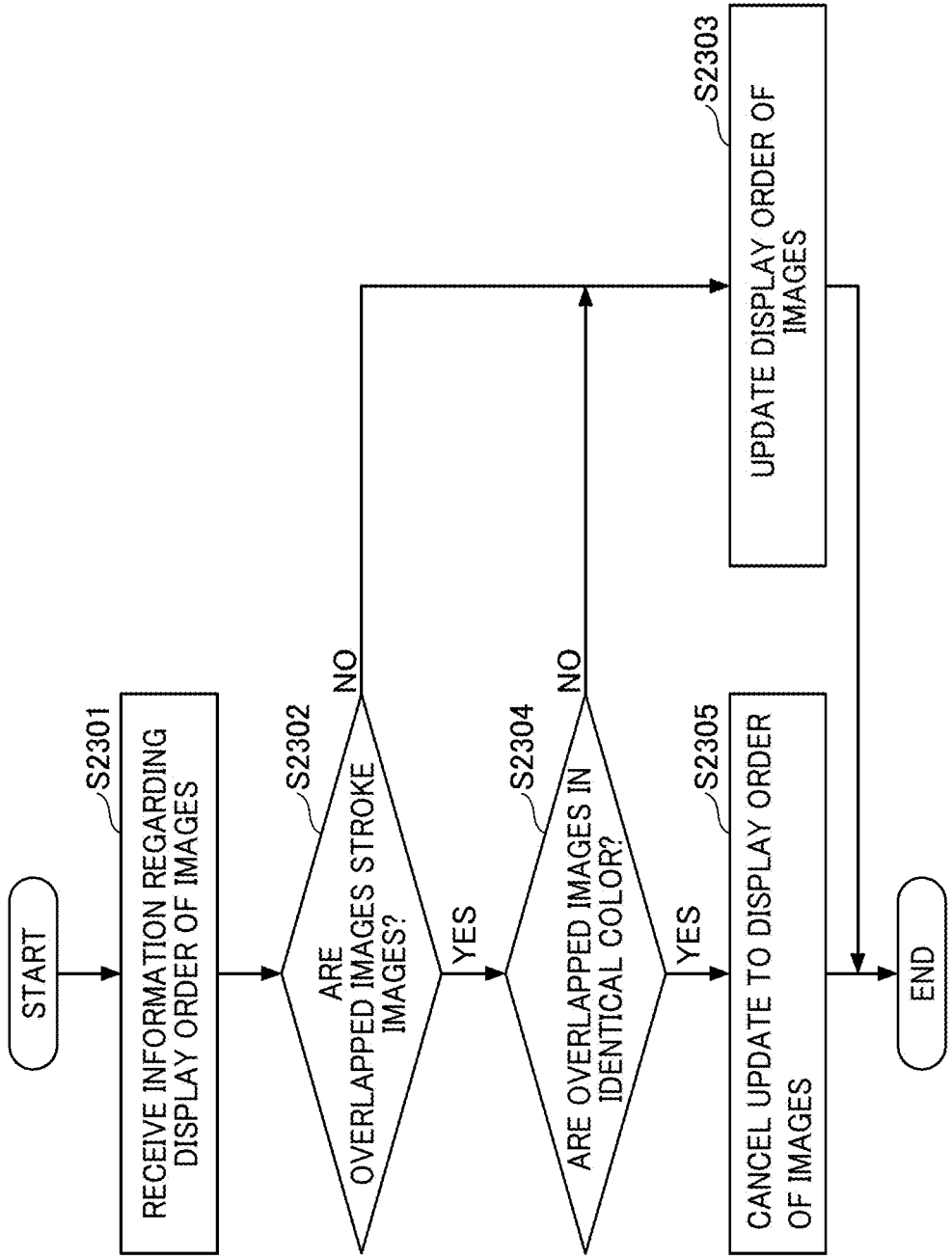

COMMUNICATION SYSTEM, METHOD FOR COMMUNICATING TO SHARE IMAGES, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2020-132639, filed on Aug. 4, 2020, in the Japan Patent Office, the entire disclosure of which is hereby incorporated by reference herein.

BACKGROUND

Technical Field

The present invention relates to a communication system, a method for communicating to share images, and a non-transitory recording medium.

Description of the Related Art

Conference systems have been widely used to hold a conference between a plurality of communication terminals via a communication network such as the Internet.

For such a conference system, there is a known technique for exchanging the stroke data for reproducing the stroke image drawn by a user with an electronic pen, hand, or the like, between communication terminals to share the stroke image.

For example, in the communication terminal of the related art, the locations of a plurality of images such as stroke images are defined by X and Y coordinates on a two-dimensional plane. For example, the communication terminal transmits the content data defined by the X and Y coordinates to share the plurality of images with the other communication terminal. However, it has been difficult to change the display order of the plurality of shared images.

SUMMARY

Example embodiments include a communication system including a first communication terminal and a second communication terminal that shares a plurality of images with the first communication terminal. The first communication terminal includes first circuitry that receives a change of a display order of the plurality of images displayed on a display of the first communication terminal, and transmits information regarding the changed display order of the plurality of images to the second communication terminal. The second communication terminal includes second circuitry that changes the display order of the plurality of images displayed on a display of the second communication terminal in accordance with the information regarding the display order of the plurality of images received from the first communication terminal.

Example embodiments include a communication terminal that communicates with other communication terminal to share a plurality of images. The communication terminal includes circuitry that receives a change of a display order of the plurality of images displayed on a display of the communication terminal, and transmits information regarding the changed display order of the plurality of images received at the receiving to the other communication terminal, to cause the other communication terminal to change the display order of the plurality of images displayed on a display of the other communication terminal.

Example embodiments include a method for communicating with other communication terminal to share a plurality of images with the other communication terminal, performed by a communication terminal, the method comprising: receiving a change of a display order of the plurality of images displayed on a display of the communication terminal; and transmitting information regarding the changed display order of the plurality of images received at the receiving to the other communication terminal, to cause the other communication terminal to change the display order of the plurality of images displayed on a display of the other communication terminal.

Example embodiments include a non-transitory recording medium storing a program for controlling one or more processors to carry out the above-described method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is a table illustrating an example of an authentication management table according to an embodiment;

FIG. 8 is a table illustrating an example of a terminal management table according to an embodiment;

FIG. 9 is a table illustrating an example of a destination-list management table according to an embodiment;

FIG. 10 is a table illustrating an example of a session management table according to an embodiment;

FIG. 13 is a diagram illustrating an example of a screen of a destination list presented by the electronic whiteboard according to an embodiment;

FIG. 16 is a sequence diagram (2) illustrating an example of the process to share a background image and a stroke image according to an embodiment;

FIG. 23 is a flowchart illustrating an example of the process to update the display order according to an embodiment.

Figure 1:
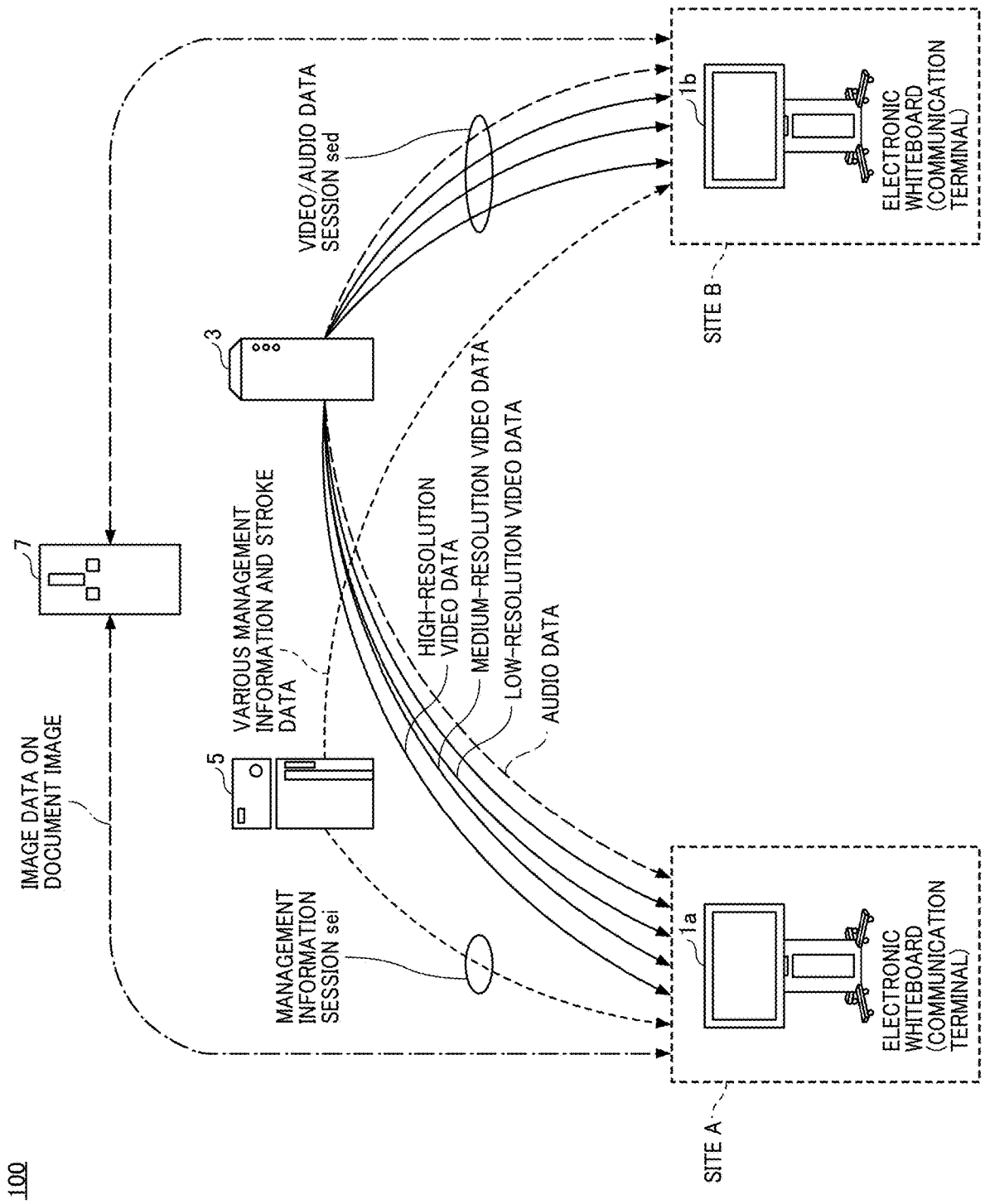
FIG. 1 is a schematic view illustrating an example of a communication route in a communication system according to an embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

Hereinafter, referring to drawings, a detailed description is given of embodiments of the present invention.

Outline of Communication System

Referring to FIG. 1, the outline of a communication system 100 to conduct a video conference while making drawings between a plurality of electronic whiteboards 1a and 1b will be first described. FIG. 1 is a schematic view illustrating an example of a communication route according to the present embodiment. The "video conference" may be referred to as "teleconference", "remote conference", "conference", etc.

A conference such as "video conference", "teleconference", or "remote conference" is an example of a session (communication) in which a plurality of communication terminals shares a stroke image. For example, the session may include a session other than a conference, such as remote class, remote medical examination, meeting, simple conversation, etc.

The communication system 100 includes, for example, the plurality of electronic whiteboards 1a and 1b, a relay device 3, a communication management device 5, an image storage device 7, etc.

The electronic whiteboards (communication terminals) 1a and 1b include terminal devices that perform mutual communications of content data, such as video data and audio data for calls, image data to be shared, and stroke data. The electronic whiteboards 1a and 1b are also called Interactive White Board (IWB).

The communication system 100 may include three or more electronic whiteboards instead of the two electronic whiteboards 1a and 1b. In the following description, any one of the electronic whiteboards included in the communication system 100 is referred to as "electronic whiteboard 1".

The electronic whiteboard 1 is an example of a communication terminal according to the present embodiment. The communication terminal may include another communication terminal having a communication function, a drawing function, a display function, etc. For example, the communication terminal may include an information terminal, such as a personal computer (PC), a tablet terminal, or a smartphone, having an application program compatible with the communication system 100 installed therein.

The stroke data is used to play back (reproduce) a stroke image and includes, for example, coordinate data, line width data, line color data, vector data, etc. The electronic whiteboards 1a and 1b exchange video data and audio data for a call to reproduce video and sound at each other's side so as to make a video call.

The electronic whiteboards 1a and 1b exchange the image data on a document image to be shared so that the users of the communication system 100 may share the same document image. The document image includes an image presented on a display of the electronic whiteboard 1. Examples of the document image include the image of a document for a conference, a background image presented on the display, or the image of a capture screen obtained when a display screen is captured.

The electronic whiteboards 1a and 1b exchange the stroke data on a stroke image to be shared so that the participants using the communication system 100 may share the same stroke image. The stroke image includes the image representing, for example, a line that is drawn by a user's handwriting stroke with an electronic pen, etc. The stroke image is displayed based on the stroke data representing the points specifying the coordinates on the display.

FIG. 1 illustrates, as an example of the electronic whiteboards 1a and 1b, an electronic whiteboard having a video-conferencing function installed therein. The image of the video data may include a moving image or a still image.

In the following description, the electronic whiteboard 1 that is a requestor requesting the start of a video conference may be referred to as "source terminal". The electronic whiteboard 1 that is a destination (relay destination) of the request may be referred to as "destination terminal". For example, in FIG. 1, when the electronic whiteboard 1a requests the start of a video conference to the electronic whiteboard 1b, the electronic whiteboard 1a is the source terminal and the electronic whiteboard 1b is the destination terminal. The electronic whiteboards 1a and 1b may be used not only for communications between different offices or for communications between different rooms in the same office but also for communications within the same room or for outdoor-indoor communications or outdoor-outdoor communications.

The relay device 3 includes a computer to perform the process to relay content data for a call between the electronic whiteboards 1a and 1b.

The communication management device 5 includes a computer to manage, for example, a communication (session) between the electronic whiteboards 1a and 1b. For example, the communication management device 5 centrally manages the authentication of a login from the electronic whiteboards 1a and 1b, the communication status of the electronic whiteboards 1a and 1b, the destination list, the communication status of the relay device 3, etc. The communication management device 5 relays the stroke data to be shared between the electronic whiteboards 1a and 1b.

The image storage device 7 includes a computer to store the image data on a document image, uploaded from the electronic whiteboard 1a and is to be shared, and download the image data to the electronic whiteboard 1b, and vice versa. That is, the image storage device 7 stores the image data uploaded from the electronic whiteboard 1b and downloads the image data to the electronic whiteboard 1a.

The relay device 3, the communication management device 5, and the image storage device 7 each may include a single computer or a plurality of computers to which each divided unit (function or means) is allocated as appropriate.

In the communication system 100, a management information session sei (hereinafter referred to as "session sei") for exchanging various types of management information is established between the electronic whiteboards 1a and 1b via the communication management device 5. Four sessions are established between the electronic whiteboards 1a and 1b via the relay device 3 to exchange four types of data including, for example, high-resolution image data, medium-resolution image data, low-resolution image data, and audio data. In FIG. 1, these four sessions are collectively illustrated as a video/audio data session sed (hereinafter simply referred to as "session"). The number of sessions does not necessarily need to be four and may be less than or more than four. The session may be established directly between the source terminal and the destination terminal without involving the relay device 3.

In the communication system 100, the stroke data may be exchanged between the electronic whiteboards 1a and 1b using the session sei.

A description is now given of the resolution of video data to be processed according to the present embodiment. The low-resolution video data has, for example, 160 pixels in the horizontal direction and 120 pixels in the vertical direction. The low-resolution video data serves as a base image. The medium-resolution video data has 320 pixels in the horizontal direction and 240 pixels in the vertical direction. The high-resolution video data has, for example, 640 pixels in the horizontal direction and 480 pixels in the vertical direction. In the case of passing via a narrow band path, low-quality video data exclusively including the low-resolution video data serving as the base image is relayed. In the case of a relatively wide band path, medium-quality video data including the low-resolution video data serving as the base image and the medium-resolution video data is relayed. In the case of a wider band path, high-quality video data including the low-resolution video data serving as the base image, the medium-resolution video data, and the high-resolution video data is relayed. As the audio data has a smaller data size than that of the video data, the audio data is relayed even via the narrow band path.

Usage of Electronic Whiteboard

Figure 2:
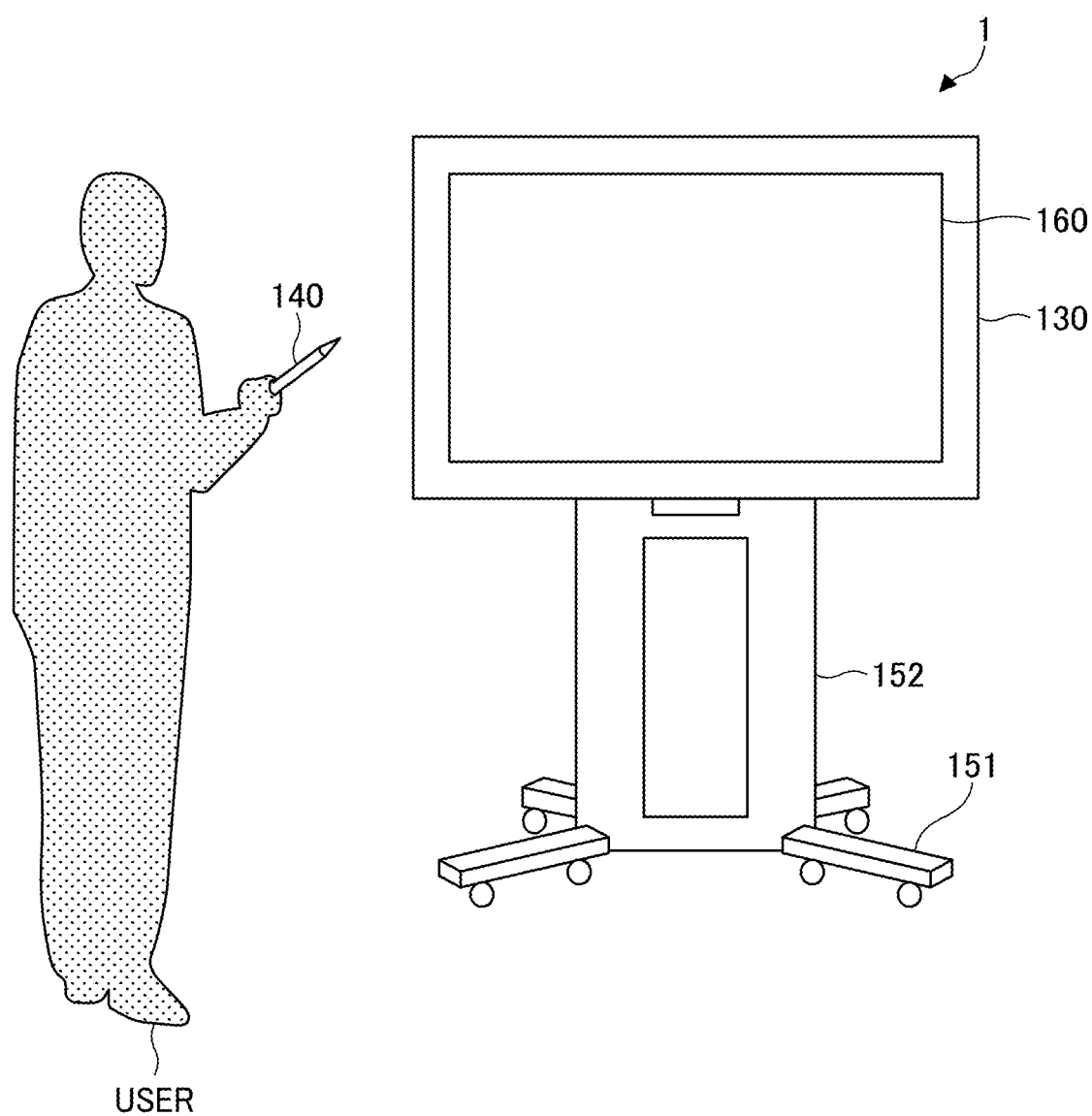
FIG. 2 is a diagram illustrating a usage of an electronic whiteboard according to an embodiment.

FIG. 2 is a diagram illustrating a usage of the electronic whiteboard 1 according to an embodiment. As illustrated in FIG. 2, the electronic whiteboard 1 includes a plurality of legs 151 each having a plurality of casters on the lower side, a support 152 provided on the upper side of the legs 151, a main body 130 of the electronic whiteboard 1 provided on the top of the support 152, a display 160 provided on the front surface of the main body 130, etc. The main body 130 includes a central processing unit (CPU) 101, described below, etc. The user may input (draw) a stroke image such as a character on the display 160 using an electronic pen 140, or the like.

Hardware Configuration

A description is given below of a hardware configuration of each device according to the present embodiment.

Hardware Configuration of Electronic Whiteboard

Figure 3:
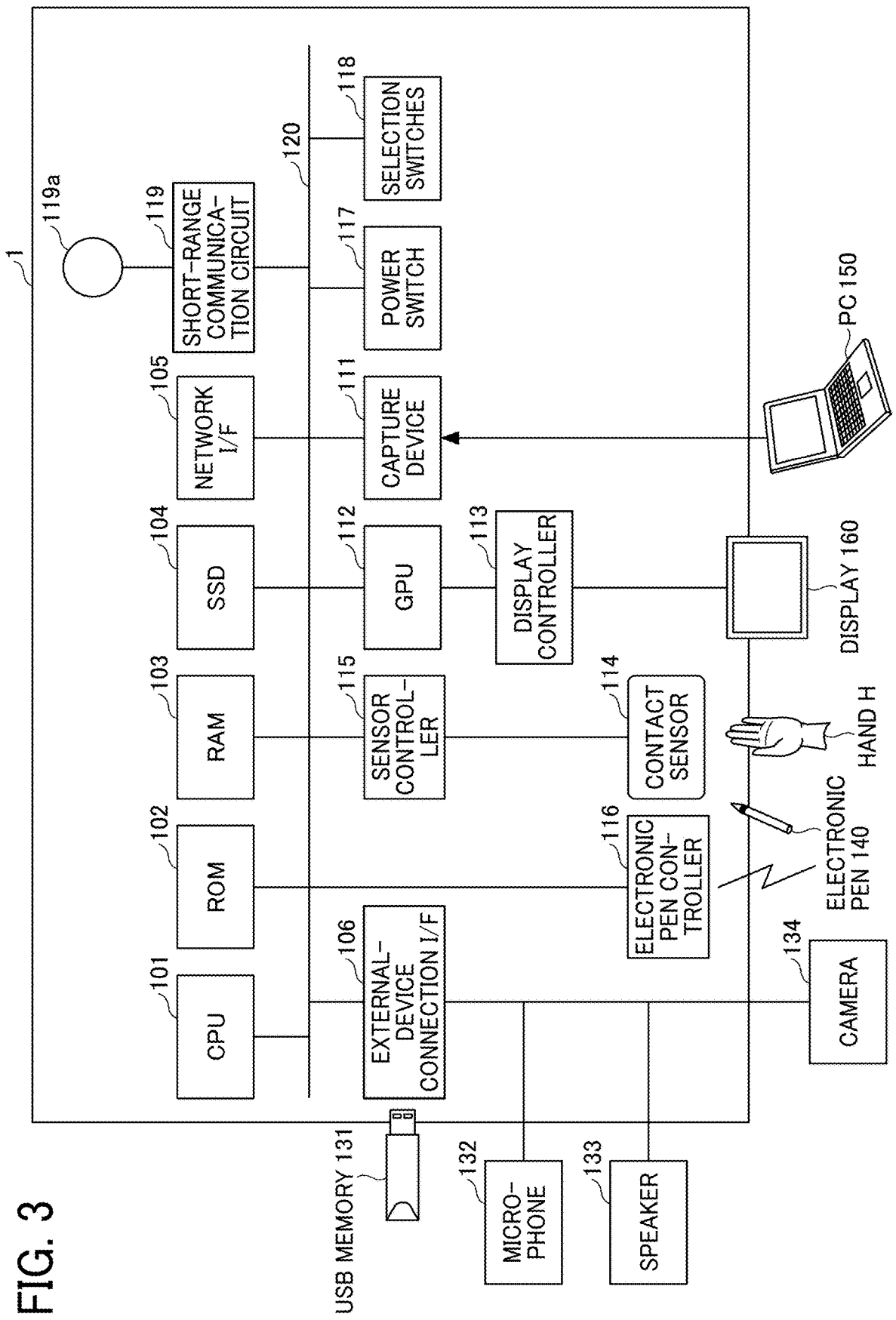
FIG. 3 is a block diagram illustrating an example of a hardware configuration of the electronic whiteboard according to an embodiment.

FIG. 3 is a block diagram illustrating an example of a hardware configuration of the electronic whiteboard 1 according to an embodiment. As illustrated in FIG. 3, the electronic whiteboard 1 includes the CPU 101, a read only memory (ROM) 102, a random access memory (RAM) 103, a solid-state drive (SSD) 104, a network interface (I/F) 105, an external-device connection I/F 106, etc.

The CPU 101 includes a processor that controls the entire operation of the electronic whiteboard 1. The ROM 102 includes a non-volatile memory that stores programs used by the CPU 101 or used for booting the CPU 101, such as an initial program loader (IPL). The RAM 103 includes a volatile memory used as a work area for the CPU 101. The SSD 104 includes a large-capacity storage device that stores various types of data such as a program for the electronic whiteboard 1.

The network I/F 105 includes a communication interface to connect the electronic whiteboard 1 to a communication network through which the electronic whiteboard 1 performs a communication. The external-device connection I/F 106 includes an interface to connect various external devices. In this case, examples of the external devices include a universal serial bus (USB) memory 131, external devices (a microphone 132, a speaker 133, and a camera 134), etc.

The electronic whiteboard 1 further includes a capture device 111, a graphics processing unit (GPU) 112, a display controller 113, a contact sensor 114, a sensor controller 115, an electronic pen controller 116, a short-range communication circuit 119, an antenna 119a for the short-range communication circuit 119, a power switch 117, selection switches 118, etc.

The capture device 111 captures (acquires) a display screen, or the like, presented on a display, or the like, of an external PC (for example, PC 150) as a still image or a moving image. The GPU 112 includes a semiconductor chip (processor) dedicated to processing of graphics. The display controller 113 controls and manages the screen display so as to output, to the display 160, or the like, the image output from the GPU 112. The contact sensor 114 detects the contact on the display 160 with the electronic pen 140, a hand H of the user, etc. The sensor controller 115 controls processing of the contact sensor 114.

The contact sensor 114 inputs and detects a coordinate using, for example, an infrared blocking system. According to this method for inputting and detecting a coordinate, the display 160 is provided with two light receiving/emitting devices on both upper side ends thereof so that a plurality of infrared rays is emitted in parallel to the display 160 and reflected by a reflective member surrounding the display 160 and the light returning in the same optical path as that of the emitted light is received by a light receiving element. The contact sensor 114 outputs, to the sensor controller 115, an identifier (ID) of the infrared ray that is blocked by an object after being emitted from the two light receiving/emitting devices. The sensor controller 115 specifies the coordinate position that is the touch position of the object. The electronic pen controller 116 communicates with the electronic pen 140 to detect a touch on the display 160 with the tip or bottom of the electronic pen 140. The short-range communication circuit 119 includes a communication circuit for Near Field Communication (NFC), Bluetooth (registered trademark), etc.

The power switch 117 includes a switch that turns on or off the power of the electronic whiteboard 1. The selection switches 118 include a group of switches to adjust brightness, hue, or the like, of presentation on the display 160, for example. The electronic whiteboard 1 further includes a bus line 120. The bus line 120 includes an address bus, a data bus, and various control signals, or the like, for electrically connecting the elements such as the CPU 101 illustrated in FIG. 3.

The contact sensor 114 is not limited to the infrared blocking system and may include a capacitive touch panel that detects changes in capacitance to specify a contact position or a resistive touch panel that specifies a contact position based on changes in the voltage of two opposed resistance films. The contact sensor 114 may use various detectors such as an electromagnetic induction touch panel that detects electromagnetic induction caused due to the contact of an object with the display so as to specify the contact position. The electronic pen controller 116 may also detect a touch by another part of the electronic pen 140, such as a part gripped by the user of the electronic pen 140, as well as the tip or bottom of the electronic pen 140.

Hardware Configuration of Communication Management Device, Relay Device, Image Storage Device, PC, etc.

Figure 4:
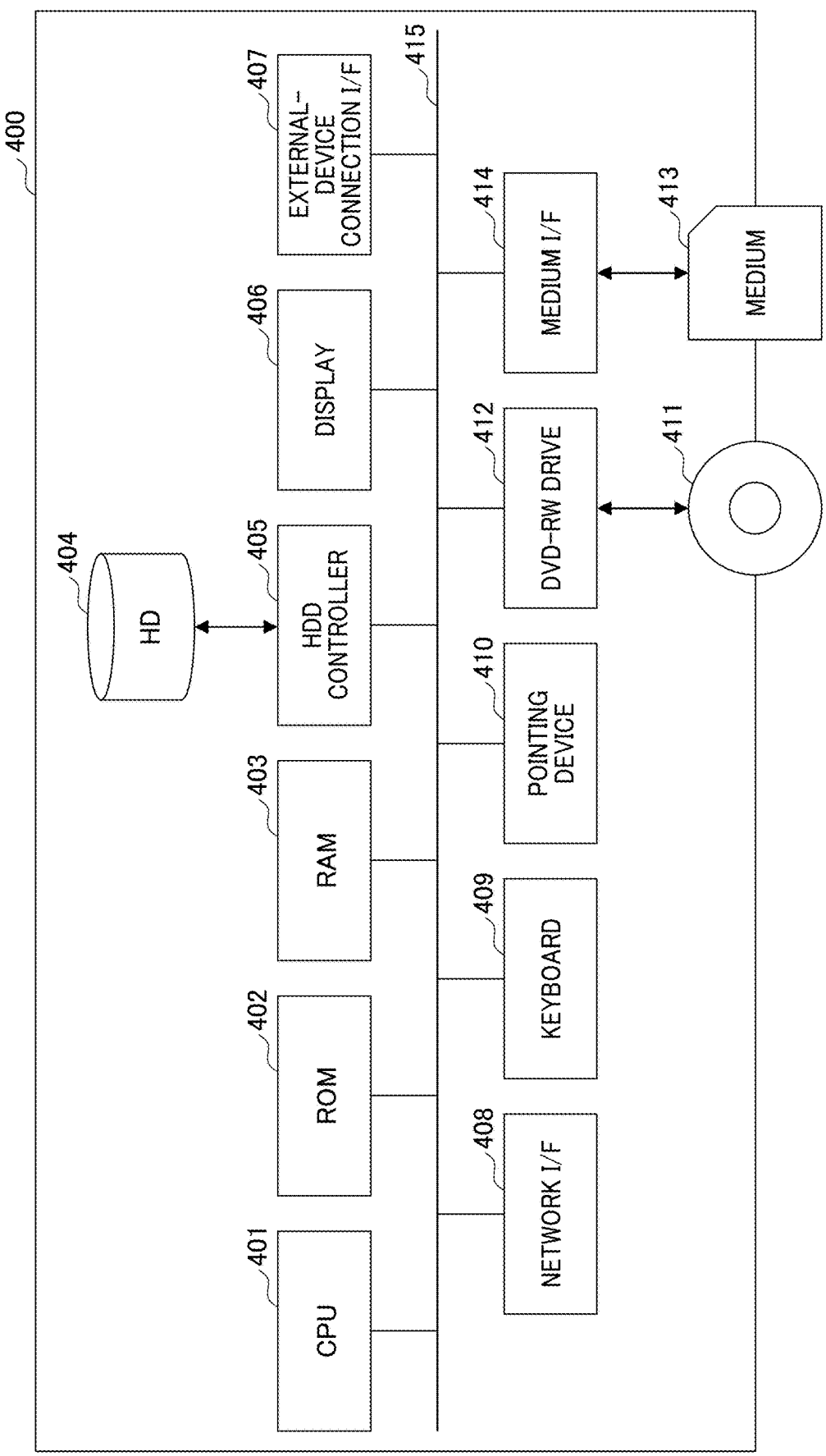
FIG. 4 is a block diagram illustrating a hardware configuration of a computer according to an embodiment.

The communication management device 5, the relay device 3, the image storage device 7, a PC 170, and the like, each have a hardware configuration of a computer 400 illustrated in FIG. 4, for example. Alternatively, the communication management device 5, the relay device 3, and the image storage device 7 may be implemented by the plurality of computers 400.

FIG. 4 is a block diagram illustrating the hardware configuration of the computer 400 according to an embodiment. The computer 400 includes a CPU 401, a ROM 402, a RAM 403, a hard disk (HD) 404, a hard disk drive (HDD) controller 405, a display 406, an external-device connection I/F 407, a network I/F 408, a keyboard 409, a pointing device 410, a digital versatile disk-rewritable (DVD-RW) drive 412, a medium I/F 414, and a bus line 415.

The CPU 401 includes a processor that controls the entire operation of the computer 400. The ROM 402 includes a nonvolatile memory that stores programs, such as IPL, used for booting the CPU 401. The RAM 403 includes a volatile memory used as, for example, a work area for the CPU 401. The HD 404 includes a large-capacity storage device that stores, for example, an operating system (OS), programs such as applications, and various types of data. The HDD controller 405 controls reading and writing of various types of data from and to the HD 404 under the control of the CPU 401.

The display 406 presents various types of information such as a cursor, menu, window, character, or image. The external-device connection I/F 407 includes an interface to connect various external devices. The network I/F 408 includes a communication interface to perform data communications using a communication network. The keyboard 409 is an example of an input device including a plurality of keys to input, for example, characters, numerals, or various instructions. The pointing device 410 is an example of an input device to select or execute various instructions, select a processing target, move a cursor, or the like.

The DVD-RW drive 412 controls reading or writing (storing) of data from or to a DVD-RW 411. Alternatively, the DVD-RW drive 412 may control the reading or writing (storing) of data from or to a disc other than the DVD-RW 411. The medium I/F 414 controls reading or writing (storing) of data from or to a medium 413 such as a flash memory. The bus line 415 includes an address bus, a data bus, various control signals, etc., for electrically connecting the elements such as the CPU 401 illustrated in FIG. 4.

Overall Configuration of Communication System

Figure 5:
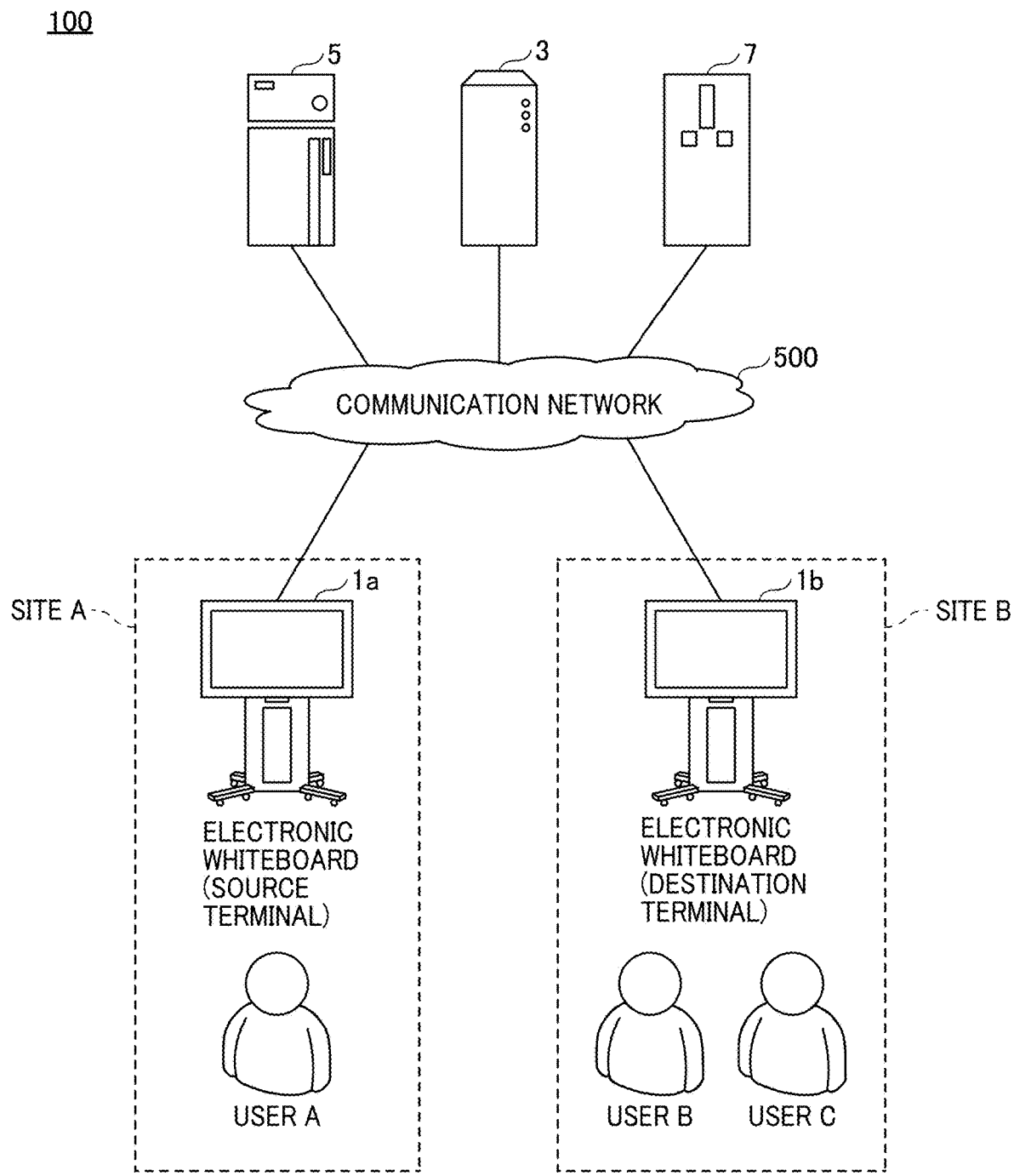
FIG. 5 is a diagram illustrating an example of a system configuration of the communication system according to an embodiment.

A description is now given of an overall configuration of the communication system 100. FIG. 5 is a diagram illustrating an example of a system configuration of the communication system 100 according to an embodiment.

In FIG. 5, the electronic whiteboard 1a is provided at a site A, and the electronic whiteboard 1b is provided at a site B. For example, the site A is a Tokyo office in Japan, and the site B is an Osaka office in Japan. It is assumed that a user A uses the electronic whiteboard 1a at the site A and a user B and a user C use the electronic whiteboard 1b at the site B. The electronic whiteboard 1a is an example of a first communication terminal, and the electronic whiteboard 1b is an example of a second communication terminal.

The electronic whiteboards 1a and 1b, the relay device 3, the communication management device 5, and the image storage device 7 may exchange data with each other via a communication network 500 such as the Internet or a local area network (LAN). The communication network 500 may include a wireless communication part. In FIG. 5, it is assumed that the electronic whiteboards 1a and 1b may exchange conference images.

Functional Configuration

Figure 6:
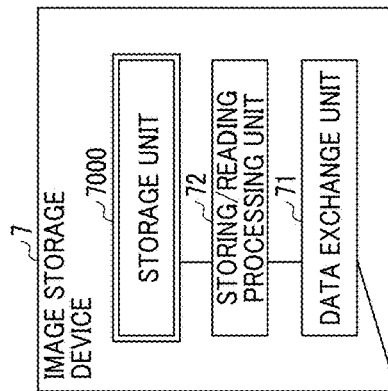
FIG. 6 is a block diagram illustrating an example of a functional configuration of the communication system according to an embodiment.

Next, a functional configuration of the communication system 100 according to the present embodiment will be described. FIG. 6 is a block diagram illustrating an example of the functional configuration of the communication system 100 according to an embodiment.

<Functional Configuration of Electronic Whiteboard>

Referring to FIG. 6, a description is first given of a functional configuration of the electronic whiteboards 1a and 1b. As the electronic whiteboards 1a and 1b have the same function, the function of the electronic whiteboard 1 is described below. In the description and the drawings, the functional units of the electronic whiteboards 1a and 1b are denoted by the reference numerals with "a" and "b" attached thereto, respectively.

The electronic whiteboard 1 includes a data exchange unit 11, a reception unit 12, a video/audio processing unit 13, a display control unit 14, an image processing unit 15, an information transmission unit 16, a short-range communication unit 17, a storing/reading processing unit 18, and the like, each of which is implemented by executing a predetermined program by the CPU 101 of FIG. 3, for example. The electronic whiteboard 1 further includes a storage unit 1000 implemented by, for example, the RAM 103 or the SSD 104 of FIG. 3. At least a part of the above functional units may be implemented by hardware.

The data exchange unit 11 exchanges various types of data and information with another terminal, device, or system via the communication network 500. The data exchange unit 11 also serves as a start unit to log in to the communication management device 5, or the like, and to start a communication with another communication terminal.

The reception unit 12 receives various inputs from the user using the electronic pen 140, or the like. For example, the reception unit 12 receives operations for drawing stroke images, various settings, selections, etc. The reception unit 12 according to the present embodiment receives the operation to change the display order of a plurality of images (e.g., stroke images) presented on a display such as the display 160.

The video/audio processing unit 13 performs the primary processing of the video conference function. For example, the video/audio processing unit 13 performs digital processing such as encoding of video data and audio data in accordance with the output signal of the microphone 132 and the output signal of the camera 134. For example, the video/audio processing unit 13 generates a video signal and an audio signal based on video data and audio data received by the data exchange unit 11. Further, for example, the video/audio processing unit 13 combines video data having different resolutions.

The display control unit 14 outputs a video signal (image signal), or the like, to the display such as the display 160 to perform the control so as to present the display screen. The display control unit 14 according to the present embodiment performs a display control process to change the display order of a plurality of images presented on the display such as the display 160 of the electronic whiteboard 1 in accordance with the information regarding the display order of the plurality of images transmitted from the other electronic whiteboard 1 that is communicating therewith.

The image processing unit 15 performs the primary processing of an electronic whiteboard function. For example, the image processing unit 15 generates a stroke image and stroke data based on the stroke with the electronic pen 140, or the like, received by the reception unit 12 or generates a stroke image based on the stroke data received by the data exchange unit 11. For example, the image processing unit 15 generates an image signal based on the image data on a document image received by the data exchange unit 11.

The information transmission unit 16 performs an information transmission process to transmit the stroke data generated by the image processing unit 15 to the other electronic whiteboard 1 communicating with the electronic whiteboard 1 via the communication management device 5. The information transmission unit 16 according to the present embodiment transmits the information regarding the display order of the plurality of images, changed by the reception unit 12, to the other electronic whiteboard 1 communicating with the electronic whiteboard 1 via the communication management device 5. The information transmission unit 16 may transmit the stroke data, the information regarding the display order of the plurality of images, and the like, to the other electronic whiteboard 1, which is communicating therewith, without involving the communication management device 5.

The short-range communication unit 17 acquires and provides data via a short-range wireless communication with each terminal having a short-range communication unit.

For example, the storing/reading processing unit 18 stores various types of data in the storage unit 1000 and reads various types of data stored in the storage unit 1000.

Each time the video data and the audio data are received during a communication with another terminal, for example, the video data and the audio data are overwritten and stored in the storage unit 1000. The display 160 presents an image based on the video data before being overwritten, and the speaker 133 outputs sound based on the audio data before being overwritten.

The storage unit 1000 according to the present embodiment stores shared information 1001, and the like, which is information about a plurality of images shared with the other electronic whiteboard 1.

Functional Configuration of Communication Management Device

The communication management device 5 includes a data exchange unit 51, an authentication unit 52, a terminal management unit 53, a session management unit 54, a relay-device management unit 55, a shared-information management unit 56, a generation unit 57, a storing/reading processing unit 58, and the like, each of which is implemented by executing a predetermined program by the CPU 401 of FIG. 4, for example. Each of the above functional configurations may be implemented by a program executed by the plurality of computers 400. At least a part of the above functional configurations may be implemented by hardware.

The communication management device 5 includes a storage unit 5000 implemented by the HD 404, the HDD controller 405, or the like, of FIG. 4. The storage unit 5000 stores, for example, an authentication management database (DB) 5001, a terminal management DB 5002, a destination-list management DB 5003, a session management DB 5004, a relay-device management DB 5005, shared information 5006, and the like.

Authentication Management Table

FIG. 7 is a table illustrating an example of an authentication management table 700 according to an embodiment. The storage unit 5000 stores, for example, the authentication management DB 5001 including the authentication management table 700 illustrated in FIG. 7. The authentication management table 700 manages the terminal IDs of the plurality of electronic whiteboards 1 managed by the communication management device 5 and the passwords corresponding to the respective terminal IDs in association with each other. For example, in the authentication management table 700 illustrated in FIG. 7, a password "aaaa" corresponds to a terminal ID "01*aa*" of the electronic whiteboard 1*a*.

The terminal ID includes identification information for identifying the electronic whiteboard (communication terminal) 1 and is an example of the identification information for the communication management device 5 to manage a communication terminal such as the electronic whiteboard 1. For example, the communication management device 5 may manage the electronic whiteboard 1 by using a user ID for identifying a user, a contract ID for identifying a contractor, a communication ID for identifying a communication source, or the like, instead of the terminal ID.

The password is an example of the authentication information for authenticating a communication terminal such as the electronic whiteboard 1. The authentication information may include authentication information such as access token or digital certificate other than a password.

Terminal Management Table

FIG. 8 is a table illustrating an example of a terminal management table 800 according to an embodiment. The storage unit 5000 stores, for example, the terminal management DB 5002 including the terminal management table 800 illustrated in FIG. 8. The terminal management table 800 manages, for each terminal ID for identifying each of the electronic whiteboards 1, the destination name when each of the electronic whiteboards 1 is set as a destination, the operating status of each of the electronic whiteboards 1, the reception time and date when the communication management device 5 receives login request information described below, the IP address of each of the electronic whiteboards 1, and the like, in association with each other.

For example, in the terminal management table 800 illustrated in FIG. 8, the electronic whiteboard 1a having the terminal ID "01aa" has "Japan, Tokyo office, terminal AA" as the terminal name and "online (communication enabled)" as the operating status. The electronic whiteboard 1a with the terminal ID "01aa" has "20xx.4.10.13:40" as the time and date when the communication management device 5 receives the login request information and "1.2.1.3" as the IP address. The terminal ID, the destination name, the IP address of the terminal, and the like are stored, for example, when each of the electronic whiteboards 1 is previously registered to receive the service provided by the communication management device 5.

Destination-List Management Table

FIG. 9 is a table illustrating an example of a destination-list management table 900 according to an embodiment. The storage unit 5000 stores, for example, the destination-list management DB 5003 including the destination-list management table 900 illustrated in FIG. 9. The destination-list management table 900 manages the terminal ID of the electronic whiteboard 1 (source terminal) requesting the start of a communication in association with all the terminal IDs of destination terminals that are registered as candidates for the electronic whiteboard 1 (destination terminal) as the destination. For example, in the destination-list management table 900 illustrated in FIG. 9, the candidates for the destination terminal with which the source terminal (the electronic whiteboard 1a) having the terminal ID "01aa" may request the start of a communication include the electronic whiteboard 1b having the terminal ID "01ba", or the like. The candidates for the destination terminal are updated by addition or deletion in accordance with an addition or deletion request from any source terminal to the communication management device 5.

Session Management Table

FIG. 10 is a table illustrating an example of a session management table 1010 according to an embodiment. The storage unit 5000 stores, for example, the session management DB 5004 including the session management table 1010 illustrated in FIG. 10. The session management table 1010 manages, for each session ID that is identification information for identifying a session (communication), the device ID of the relay device 3 used, the terminal ID of the source terminal, the terminal ID of the destination terminal, and the like, in association with each other. The session management table 1010 further manages information such as the reception delay time (millisecond (ms)) of video data received by the destination terminal and the reception time and date of the delay information indicating the delay time and received from the destination terminal in association with each other. For example, in the session management table 1010 illustrated in FIG. 10, during the session with a session ID "se01", the relay device 3 having a device ID "111a" relays the communication between the source terminal having the terminal ID "01aa" and the destination terminal having the terminal ID "01ba". During the session with the session ID "se01", the delay time of the video data at "20xx.4.10.13:41" is 200 (ms).

Relay-Device Management Table

Figure 11:
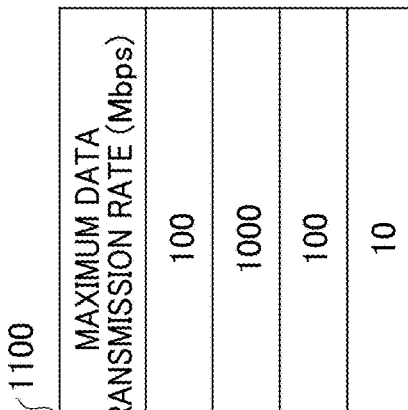
FIG. 11 is a table illustrating an example of a relay-device management table according to an embodiment.

FIG. 11 is a table illustrating an example of a relay-device management table 1100 according to an embodiment. The storage unit 5000 stores, for example, the relay-device management DB 5005 including the relay-device management table 1100 illustrated in FIG. 11. The relay-device management table 1100 manages, for each of the device IDs of the relay devices 3, the operating status of the corresponding relay device 3, the reception time and date of the status information indicating the operating status, the IP address of the relay device 3, the maximum data transmission rate (megabits per second (Mbps)), and the like, in association with each other. For example, in the relay-device management table 1100 illustrated in FIG. 11, the relay device 3 with the device ID "111a" has "online" as the operating status and "20xx.4.10.12:00" as the reception time and date of the status information received by the communication management device 5. Furthermore, the relay device 3 with the device ID "111a" has "1.2.1.2" as the IP address of the relay device 3 and 100 Mbps as the maximum data transmission rate of the relay device 3.

Each Functional Configuration of Communication Management Device

Here, referring back to FIG. 6, each functional configuration of the communication management device 5 will be described.

The data exchange unit 51 exchanges various types of data (or information) with other terminals, devices, or systems via the communication network 500. For example, the data exchange unit 51 transfers (transmits) data (e.g., stroke data) on a plurality of images, the information regarding the display order of the plurality of images, and the like, transmitted from the electronic whiteboard 1a, to the other electronic whiteboard 1b communicating with the electronic whiteboard 1a.

The authentication unit 52 conducts authentication of the login request received via the data exchange unit 51. For example, the authentication unit 52 permits the login of the electronic whiteboard 1 when the authentication management table 700 illustrated in FIG. 7 stores the combination of the terminal ID and the password included in the login request received from the electronic whiteboard 1.

The terminal management unit 53 manages the terminal management DB 5002 and, for example, updates information such as the operating status, the reception time and date, and the terminal IP address in the terminal management table 800 illustrated in FIG. 8 in accordance with the status of the electronic whiteboard 1.

The terminal management unit 53 manages the destination-list management table 900 and, for example, provides the destination list information including the terminal ID of the destination terminal in the destination-list management table 900 illustrated in FIG. 9 in response to a request from the electronic whiteboard 1.

The session management unit 54 manages a session (e.g., communication or conference) held by the communication system 100. For example, the session management unit 54 generates the session ID for identifying the session based on the start request information requesting the start of a communication from the electronic whiteboard 1. The session management unit 54 stores and manages various types of information regarding the session in association with the session ID in, for example, the session management table 1010 illustrated in FIG. 10.

The relay-device management unit 55 manages the relay-device management DB 5005 and, for example, uses the relay-device management table 1100 illustrated in FIG. 11 to select the relay device 3 used to relay the session. For example, the relay-device management unit 55 may select the relay device 3 near the source terminal based on the IP address of each of the relay devices 3 stored in the relay-device management table 1100 and the IP address of the source terminal. Alternatively, the relay-device management unit 55 may select the relay device 3 based on, for example, the maximum data transmission rate of each of the relay devices 3 stored in the relay-device management table 1100.

According to the present embodiment, the relay device 3 used to relay the session may be selected by any method. The communication system 100 may include the one relay device 3 and use the same relay device 3 for each session.

The shared-information management unit 56 stores and manages, in the shared information 5006, the information on the plurality of images shared by the plurality of electronic whiteboards 1 participating in the session (e.g., communication or conference), the information indicating the display order of the plurality of images, and the like, in association with the session ID for identifying the session.

The generation unit 57 generates, for example, the Uniform Resource Locator (URL) indicating the storage position of the image data on a document image in response to a request from a communication terminal such as the electronic whiteboard 1.

For example, the storing/reading processing unit 58 stores various types of data in the storage unit 5000 or reads various types of data stored in the storage unit 5000.

Functional Configuration of Image Storage Device

The image storage device 7 includes a data exchange unit 71, a storing/reading processing unit 72, etc., each of which is implemented by executing a predetermined program by the CPU 401 illustrated in FIG. 4. The image storage device 7 includes a storage unit 7000 implemented by, for example, the RAM 403, the HD 404, the HDD controller 405, and the like, illustrated in FIG. 4.

The data exchange unit 71 exchanges various types of data, information, and the like, with other terminals, devices, or systems via the communication network 500. The storing/reading processing unit 72 stores various types of data in the storage unit 7000 or reads various types of data from the storage unit 7000.

With the above configuration, for example, the image storage device 7 stores the image data uploaded from the electronic whiteboard 1 in the specified URL and provides the image data stored in the specified URL in response to a request from the electronic whiteboard 1.

Functional Configuration of Relay Device

The relay device 3 includes a data exchange unit (transfer unit) 31, a determination unit 32, a storing/reading processing unit 33, and the like, each of which is implemented by executing a predetermined program by the CPU 401 of FIG. 4, for example. The relay device 3 includes a storage unit 3000 implemented by, for example, the RAM 403, the HD 404, or the HDD controller 405 of FIG. 4.

The data exchange unit (transfer unit) 31 exchanges various types of data, information, and the like, with other terminals, devices, or systems via the communication network 500. The data exchange unit 31 also serves as a transfer unit that, for example, transfers video data, audio data, and the like, received from the electronic whiteboard 1, to the other electronic whiteboard 1 participating in the same session as that of the electronic whiteboard 1. The determination unit 32 makes various determinations such as a determination on a data delay state.

For example, the storing/reading processing unit 33 stores various types of data in the storage unit 3000 and reads various types of data from the storage unit 3000.

The functional configuration of the communication system 100 illustrated in FIG. 6 is an example and may be variously modified and applied. For example, each functional configuration included in the communication management device 5 may be implemented by the plurality of computers 400. The electronic whiteboard (communication terminal) 1 may include at least a part of the functional configurations included in the communication management device 5. Similarly, the communication management device 5 may include at least a part of the functional configurations included in the electronic whiteboard 1.

The function of the image storage device 7 may be implemented by a storage server, or the like, outside (or inside) the communication system 100. The communication management device 5 may include at least a part of the functional configurations of the image storage device 7 and the relay device 3. The electronic whiteboard 1 is an example of a communication terminal. The communication terminal may include an information terminal, or the like, which executes an application corresponding to the communication system 100.

Process Flow

Next, the process flow of a communication method according to the present embodiment will be described.

Process at Preparation Phase

Figure 12:
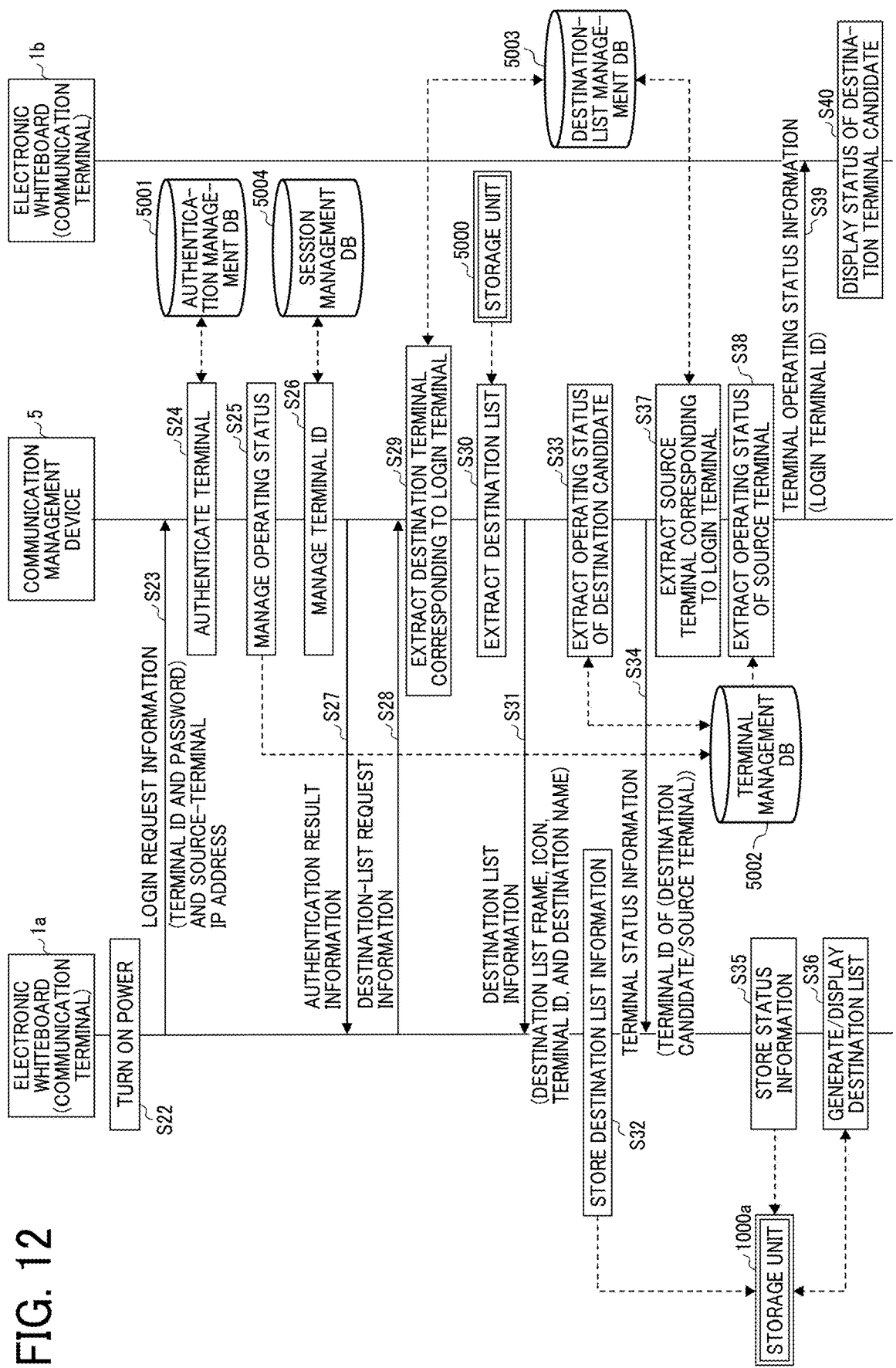
FIG. 12 is a sequence diagram illustrating an example of a process at a preparation phase according to an embodiment.

FIG. 12 is a sequence diagram illustrating an example of a process at a preparation phase according to an embodiment. The process here is an example of the process at the preparation phase performed before the electronic whiteboard 1 participates in the session (e.g., communication or conference) in the communication system 100.

First, when a power switch 122 of the electronic whiteboard 1a is turned on, the reception unit 12a receives the power-on (Step S22).

Subsequently, the data exchange unit 11a transmits the login request information for requesting the login to the communication management device 5 via the communication network 500 (Step S23). The login request information includes, for example, the terminal ID of the electronic whiteboard 1a, a password, etc.

Subsequently, the authentication unit 52 of the communication management device 5 searches the authentication management table 700 illustrated in FIG. 7 by using the terminal ID and the password included in the login request information received via the data exchange unit 51 as search keys. When the combination of the terminal ID and the password included in the login request information is managed in the authentication management table 700, the authentication unit 52 permits the login of the electronic whiteboard 1a (Step S24). When the combination of the terminal ID and the password included in the login request information is managed in the authentication management table 700, the process after Step S25 is executed.

When the login of the electronic whiteboard 1a is permitted, the terminal management unit 53 updates the information corresponding to the terminal ID "01aa" of the electronic whiteboard 1a in the terminal management table 800 illustrated in FIG. 8. For example, the terminal management unit 53 changes the information "operating status" corresponding to the terminal ID "01aa" to "online (communication enabled)" and updates the information "reception time and date" to the reception time and date of the login request information (Step S25). Instead of the previously registered IP address, the IP address transmitted from the electronic whiteboard 1a at Step S23 described above may be used as the IP address information on the terminal in the terminal management table 800. Due to this process, as illustrated in FIG. 8, for example, the terminal ID "01aa" is associated with the operating status "online (communication enabled)", the reception time and date "20xx.4.10.13:40", the IP address "1.2.1.3", and the like, in the terminal management table 800 for management.

Subsequently, the session management unit 54 adds the new record having the terminal ID "01aa" of the electronic whiteboard 1a received at the above-described Step S23 as "the terminal ID of the source terminal" to the session management table 1010 illustrated in FIG. 10 for management (Step S26). Then, the data exchange unit 51 of the communication management device 5 transmits the authentication result information indicating the authentication result obtained during the process at Step S24 to the electronic whiteboard 1a, which has requested the login, via the communication network 500 (Step S27).

When receiving the authentication result information indicating the permission of the login, the data exchange unit 11a of the electronic whiteboard 1a transmits the destination-list request information indicating the request for the destination list to the communication management device 5 via the communication network 500 (Step S28). Accordingly, the data exchange unit 51 of the communication management device 5 receives the destination-list request information.

Subsequently, the terminal management unit 53 searches the destination-list management table 900 illustrated in FIG. 9 by using the terminal ID "01aa" of the electronic whiteboard 1a as a search key to read the terminal ID of the destination candidate that may communicate with the electronic whiteboard 1a. The terminal management unit 53 reads the destination name corresponding to the terminal ID of the destination candidate from the terminal management table 800 illustrated in FIG. 8 (Step S29). Thus, the terminal ID of each of the destination candidates corresponding to the terminal ID "01aa" of the electronic whiteboard 1a and the corresponding destination name are extracted. Subsequently, the data exchange unit 51 of the communication management device 5 reads, for example, the data on the destination list frame and the data on the icon indicating the operating status stored in the storage unit 5000 via the storing/reading processing unit 58 (Step S30). The data exchange unit 51 of the communication management device 5 transmits, to the electronic whiteboard 1a, the "destination list information (the destination list frame, the icon, the terminal ID, and the destination name)" including the read destination list frame and icon and the terminal ID and the destination name extracted at Step S29 (Step S31). Accordingly, in the electronic whiteboard 1a, the data exchange unit 11a receives the destination list information, and the storing/reading processing unit 18a stores the received destination list information in the storage unit 1000a (Step S32).

As described above, according to the present embodiment, the communication management device 5 centrally manages the destination list information of all the terminals instead of managing the destination list information by each of the electronic whiteboards 1. Thus, it is possible to eliminate the task performed by each of the electronic whiteboards 1 to change the destination list information when the new electronic whiteboard 1 is registered in the communication management device 5, when a communication terminal of a new model is registered instead of the already registered electronic whiteboard 1, or even when the appearance, or the like, of the destination list frame is changed, etc.

The terminal management unit 53 of the communication management device 5 searches the terminal management table 800 illustrated in FIG. 8 by using the terminal IDs of the destination candidates extracted at Step S29 as a search key to read the corresponding operating status for each of the terminal IDs of the destination candidates. Accordingly, the terminal management unit 53 acquires the operating status of each of the electronic whiteboards 1 corresponding to the terminal IDs of the destination candidates (Step S33).

Subsequently, the data exchange unit 51 of the communication management device 5 transmits the "terminal status information" including the terminal ID used as the search key at Step S33 and the operating status of the corresponding destination terminal to the electronic whiteboard 1a via the communication network 500 (Step S34).

Subsequently, the storing/reading processing unit 18a of the electronic whiteboard 1a sequentially stores the terminal status information received from the communication management device 5 in the storage unit 1000 (Step S35). Thus, the electronic whiteboard 1a may receive the status information on each of the electronic whiteboards 1 to acquire the current operating statuses of the electronic whiteboard 1b and the other electronic whiteboards 1, which are destination candidates that may communicate with the electronic whiteboard 1a.

Subsequently, the display control unit 14a of the electronic whiteboard 1a generates a destination list 1300, illustrated in FIG. 13, reflecting the status of the terminal that is a destination candidate based on the destination list information stored in the storage unit 1000a and the terminal status information. The display control unit 14a causes the display such as the display 160 of the electronic whiteboard 1a to present the generated destination list 1300 (Step S36). In the destination list 1300, the icon representing the operating status, the terminal ID, and the destination name are presented for each destination candidate. In the example of FIG. 13, the icons representing the operating statuses of the respective communication terminals are presented as "offline" and "online (communication enabled)" from the top.

The terminal management unit 53 of the communication management device 5 searches the destination-list management table 900 illustrated in FIG. 9 based on the terminal ID "01aa" of the electronic whiteboard 1a to extract the terminal ID of the other terminal that has registered the electronic whiteboard 1a as a destination candidate (Step S37).

Subsequently, the terminal management unit 53 of the communication management device 5 searches the terminal management table 800 illustrated in FIG. 8 based on the terminal ID "01aa" of the electronic whiteboard 1a to acquire the operating status of the electronic whiteboard 1a (Step S38).

Then, the data exchange unit 51 transmits the "terminal status information" including the terminal ID and the operating status of the electronic whiteboard 1a to the electronic whiteboard 1 having the terminal ID, which is included in the terminal IDs extracted at Step S37 and which has the operating status "online" in the terminal management table 800 (Step S39). When the terminal status information is transmitted to each of the electronic whiteboards 1, the data exchange unit 51 refers to the IP address of the corresponding electronic whiteboard 1 managed in the terminal management table 800 based on the corresponding terminal ID. Thus, it is possible to notify each of the electronic whiteboards 1, which may communicate with the electronic whiteboard 1a as a destination candidate, of the terminal ID "01aa" and the operating status "online" of the electronic whiteboard 1a. Accordingly, each of the electronic whiteboards 1, which are destination candidates, may display the status of the electronic whiteboard 1a (Step S40).

Session Start Process

Figure 14:
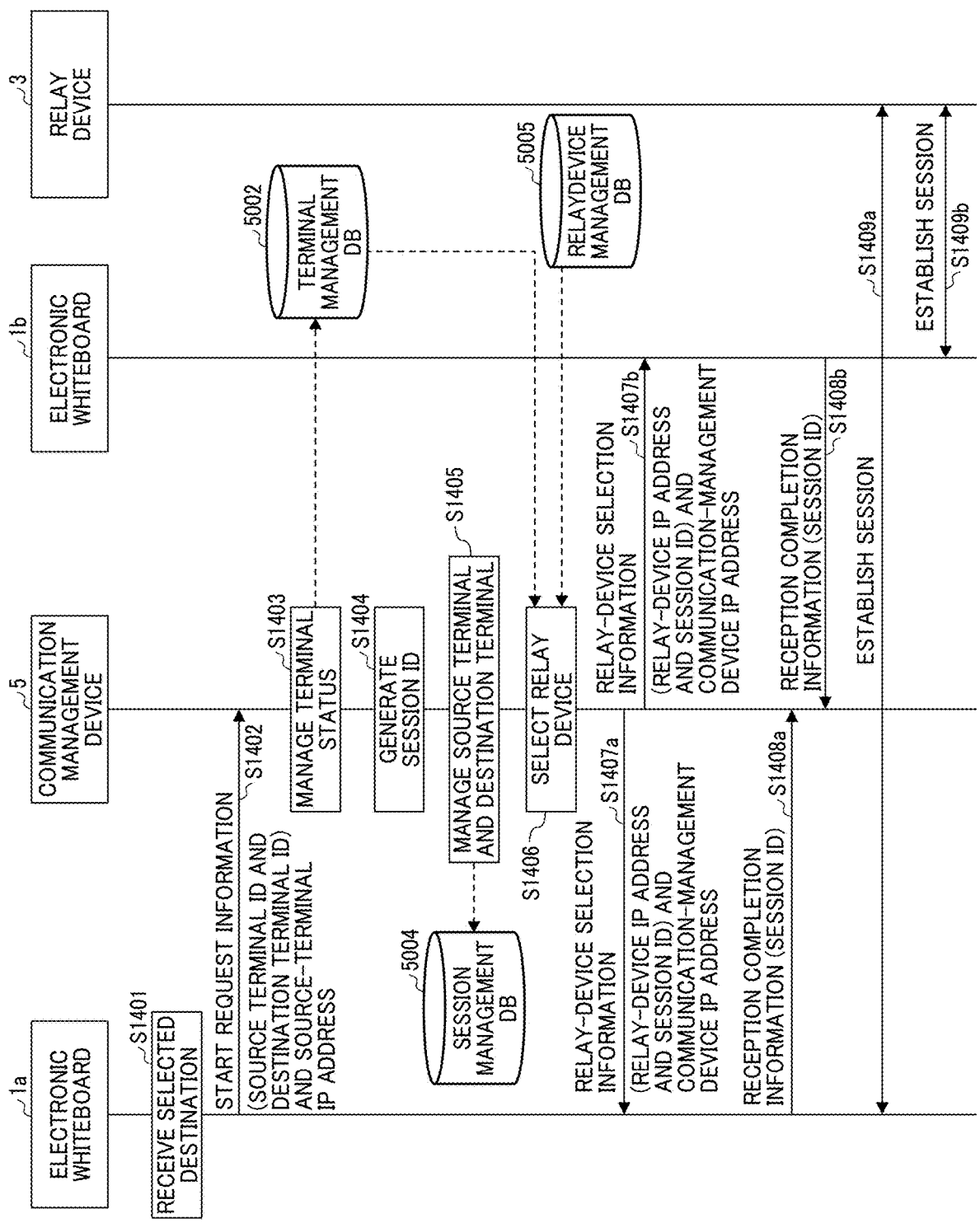
FIG. 14 is a sequence diagram illustrating an example of a session start process according to an embodiment.

FIG. 14 is a sequence diagram illustrating an example of a session start process according to an embodiment. This process is an example of the session start process performed by the communication system 100, for example, when the electronic whiteboard 1a gives a session (communication) start request to the electronic whiteboard 1b.

When the electronic whiteboard 1a, which is the source terminal, receives the destination selected by the user A at Step S1401, the process after Step S1402 is executed. Here, it is assumed that the user A has selected the electronic whiteboard 1b as a destination terminal.

After the electronic whiteboard 1a receives the destination selected by the user A, the data exchange unit 11a of the electronic whiteboard 1a transmits the start request information for requesting the start of a session to the communication management device 5 at Step S1402. The start request information includes, for example, the terminal ID "01aa" of the electronic whiteboard 1a that is the source terminal, the terminal ID "01ba" of the electronic whiteboard 1b that is the destination terminal, and the IP address of the electronic whiteboard 1a that is the source terminal. As a result, the data exchange unit 51 of the communication management device 5 receives the IP address of the source terminal (the electronic whiteboard 1a), which is the transmission source, as well as the start request information.

At Step S1403, the terminal management unit 53 of the communication management device 5 updates the terminal management DB 5002 based on the terminal ID of the source terminal and the terminal ID of the destination terminal included in the start request information. For example, the terminal management unit 53 updates the "operating status" corresponding to each of the terminal IDs "01aa" and "01ba" to "online (communication being executed)" in the terminal management table 800 based on the terminal ID "01aa" of the source terminal and the terminal ID "01ba" of the destination terminal included in the start request information. In this state, although the electronic whiteboard 1a, which is the source terminal, and the electronic whiteboard 1b, which is the destination terminal, are not participating in the session, the electronic whiteboards 1a and 1b are managed as being in the state of performing a communication.

At Step S1404, the session management unit 54 of the communication management device 5 generates the session ID for identifying the session held between the electronic whiteboards 1a and 1b. Here, it is assumed that the session management unit 54 generates the session ID "se01".

At Step S1405, the session management unit 54 stores and manages the generated session ID, the terminal ID "01aa" of the source terminal, the terminal ID "01ba" of the destination terminal, and the like, in association with each other in the session management table 1010 illustrated in FIG. 10.

At Step S1406, the relay-device management unit 55 of the communication management device 5 selects the relay device 3 that relays the session between the source terminal (the electronic whiteboard 1a) and the destination terminal (the electronic whiteboard 1b). For example, the relay-device management unit 55 selects the relay device 3 having the IP address that is close to the IP address of the source terminal (the electronic whiteboard 1a) in the terminal management table 800 from the relay devices 3 having the device IDs whose operating status is "online" in the relay-device management table 1100. Here, it is assumed that the relay device 3 having the device ID "111a" is selected.

At Steps S1407a and S1407b, the session management unit 54 of the communication management device 5 transmits relay-device selection information to the source terminal (the electronic whiteboard 1a) and the destination terminal (the electronic whiteboard 1b) via the data exchange unit 51. The relay-device selection information includes, for example, the IP address of the relay device 3 selected at Step S1406, the session ID generated at Step S1404, and the IP address of the communication management device 5.

After receiving the relay-device selection information, the data exchange units 11 of the source terminal (the electronic whiteboard 1a) and the destination terminal (the electronic whiteboard 1b) transmit, to the communication management device 5, the reception completion information indicating that the relay-device selection information has been received at Steps S1408a and S1408b. The reception completion information includes, for example, the session ID "se01" included in the relay-device selection information.

At Steps S1409a and S1409b, the data exchange units 11 of the source terminal (the electronic whiteboard 1a) and the destination terminal (the electronic whiteboard 1b) use the device ID of the relay device 3 and the session ID included in the relay-device selection information to establish a session with the relay device 3. This allows the electronic whiteboards 1a and 1b to participate in the session with the same session ID "se01" and exchange, for example, video data and audio data of a conference video with each other via the relay device 3.

By the above process, the user A of the electronic whiteboard 1a and the user B of the electronic whiteboard 1b may exchange a conference video, etc.

Communication Process for Document Image and Stroke Image

Figure 15:
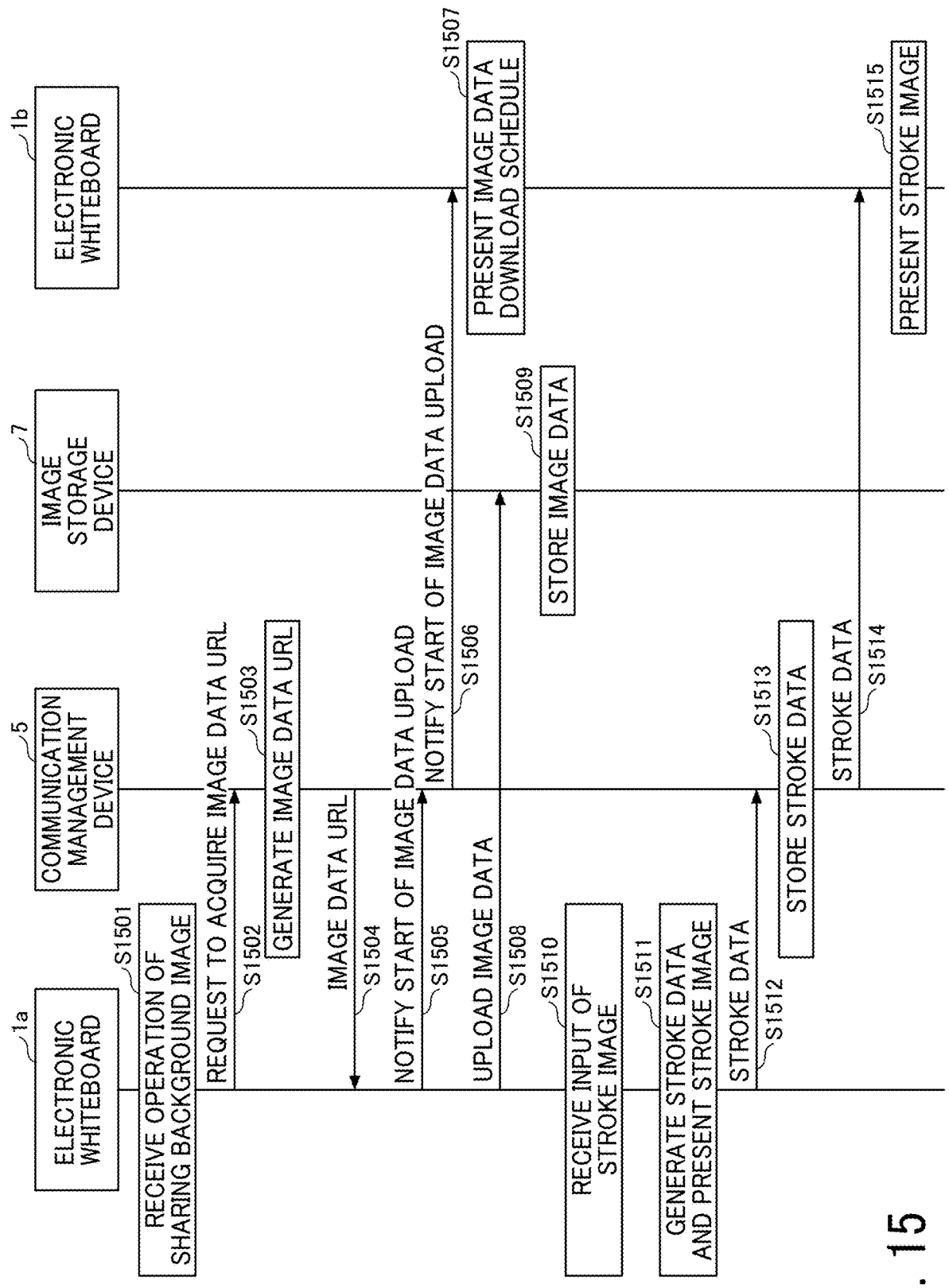
FIG. 15 is a sequence diagram (1) illustrating an example of the process to share a background image and a stroke image according to an embodiment.

Next, referring to FIGS. 15 to 17, a description is given of a communication process for a document image presented on the electronic whiteboard 1 and a stroke image input to the electronic whiteboard 1.

FIGS. 15 and 16 are sequence diagrams illustrating an example of the process to share a document image and a stroke image according to an embodiment. Here, a description is given of an example of the process in the case of sharing the document image and the stroke image on the electronic whiteboards 1a and 1b and displaying, on the electronic whiteboard 1b, the document image displayed on the electronic whiteboard 1a and the stroke image input to the electronic whiteboard 1a.

It is assumed that, at the start of the process illustrated in FIG. 15, the electronic whiteboards 1a and 1b are participating in the same session (e.g., communication or conference) by the process illustrated in FIG. 14, for example. It is assumed that the display 160 of the electronic whiteboard 1a presents, for example, a display screen 1710 illustrated in FIG. 17A.

Figure 17A:
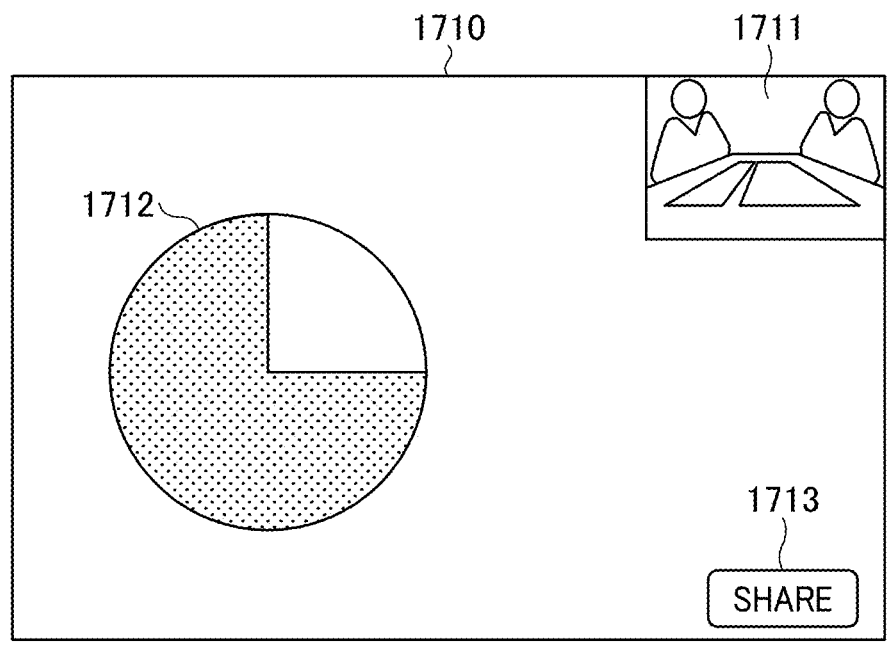
FIGS. 17A to 17D are diagrams illustrating an example of a display screen of the electronic whiteboard according to an embodiment.

In the example of FIG. 17A, the display screen 1710 presents a conference video 1711 at the site B, transmitted from the electronic whiteboard 1b, a document image 1712, a "share" button 1713, etc. In this state, when the reception unit 12a of the electronic whiteboard 1a receives the operation of sharing the document image (Step S1501) due to the pressing of the "share" button 1713 by the user A of the electronic whiteboard 1a, the process after Step S1502 is performed.

At Step S1502, the reception unit 12a of the electronic whiteboard 1a transmits, to the communication management device 5 via the data exchange unit 11a, the request to acquire the URL indicating the storage position of the image data on the document image. Accordingly, the data exchange unit 51 of the communication management device 5 receives the request to acquire the image data URL from the electronic whiteboard 1a. The URL is an example of storage position information and may be, for example, a Uniform Resource Identifier (URI).

At Step S1503, the generation unit 57 of the communication management device 5 generates the image data URL indicating the storage position of the image data on the document image in response to the request to acquire the image data URL received from the electronic whiteboard 1a. At Step S1504, the generation unit 57 transmits the generated image data URL to the electronic whiteboard 1a, which is a requestor, via the data exchange unit 51. Accordingly, the data exchange unit 11 of the electronic whiteboard 1a receives the image data URL.

At Step S1505, the data exchange unit 11a of the electronic whiteboard 1a transmits, to the communication management device 5, a notification of the start of uploading the image data on the document image. Accordingly, at Step S1506, the data exchange unit 51 of the communication management device 5 transfers (transmits) the notification of the start of uploading the image data on the document image, received from the electronic whiteboard 1a, to the other electronic whiteboard 1b that is communicating with the electronic whiteboard 1a. Thus, the data exchange unit 11b of the electronic whiteboard 1b receives the start notification.

Figure 17B:
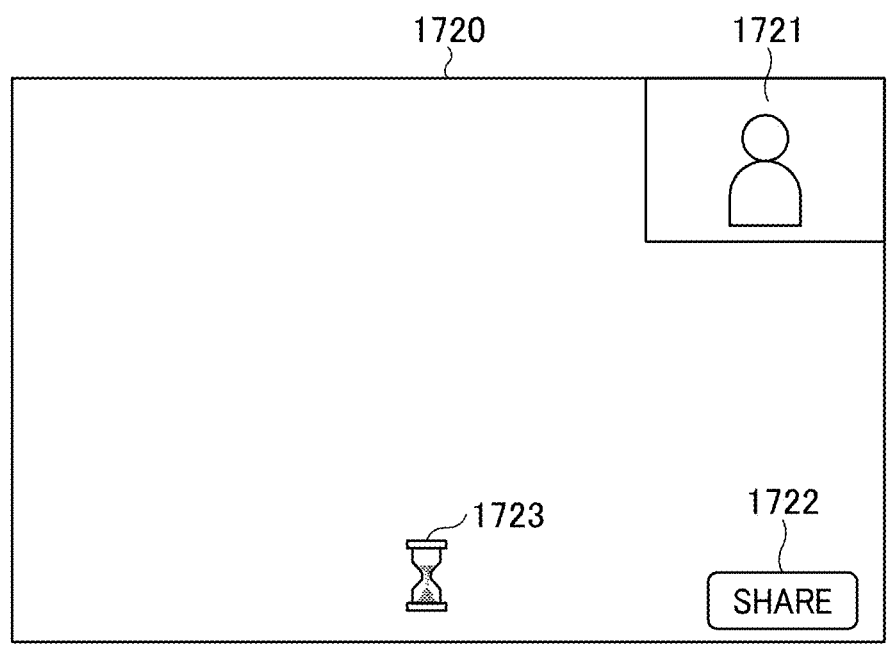

At Step S1507, the display control unit 14b of the electronic whiteboard 1b causes the display 160 of the electronic whiteboard 1b to present, for example, a display screen 1720 illustrated in FIG. 17B. The display screen 1720 initially presents a conference video 1721 at the site A, transmitted from the electronic whiteboard 1a, a "share" button 1722, etc. The display screen 1720 further presents an hourglass icon 1723 that visually indicates the elapsed time for downloading the image data on the document image in response to the start notification received at Step S1506.

The elapsed time may be indicated by a still-image hourglass or an animated hourglass with changes in the amount of sand. The hourglass icon 1723 is an example of schedule information indicating that the image data is scheduled to be downloaded. Other examples of the schedule information may include an icon (e.g., clock icon) other than an hourglass, a character (and/or "symbol") instead of an icon, and the combination of an icon and a character (and/or "symbol"). The schedule information may be notified by sound. In this case, the sound is output from the speaker 133, or the like, by the video/audio processing unit 13b instead of the display control unit 14b.

The electronic whiteboard 1a may perform the process at Step S1502 described above after the process at Step S1505 described above. The communication management device 5 may transmit the image data URL at Step S1504 described above after receiving the notification of the start of uploading the image data at Step S1505 described above.

At Step S1508, the data exchange unit 11a of the electronic whiteboard 1a uploads the image data on the document image to the URL, received at Step S1504, in the image storage device 7. Accordingly, the data exchange unit 71 of the image storage device 7 receives the image data on the document image.

At Step S1509, the storing/reading processing unit 72 of the image storage device 7 stores the received image data on the document image in the storage area corresponding to the URL in the storage unit 7000.

At Step S1510, the reception unit 12a of the electronic whiteboard 1a receives the input of the stroke image drawn on the display 160 of the electronic whiteboard 1a by the user A using the electronic pen 140 or the hand H, and then the process after Step S1511 is performed.

Figure 17C:
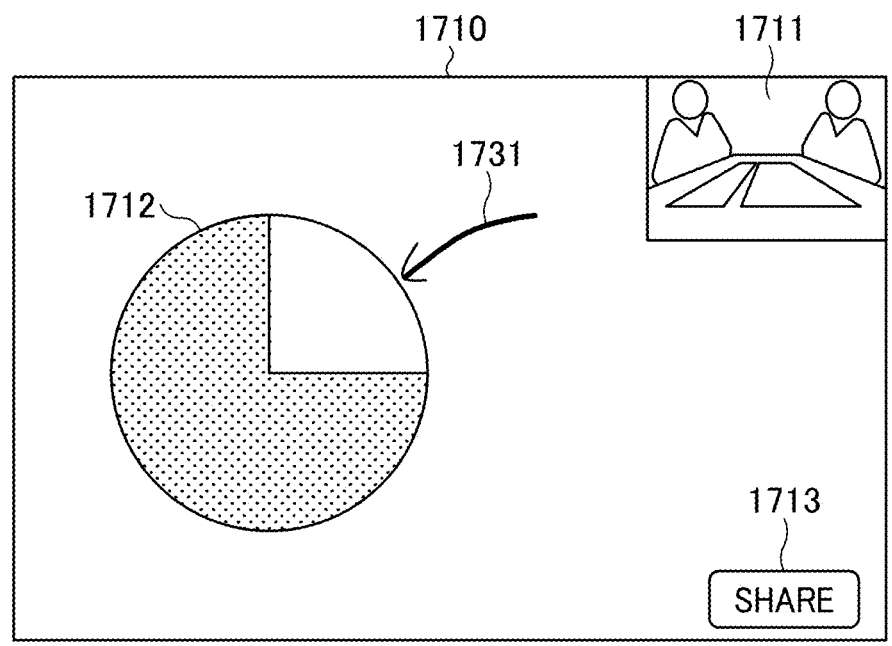

At Step S1511, the image processing unit 15a of the electronic whiteboard 1a generates the stroke data (e.g., coordinate data, line width data, line color data, or vector data) representing the input stroke image. Furthermore, the display control unit 14 of the electronic whiteboard 1a causes the display such as the display 160 of the electronic whiteboard 1a to present the stroke image. Accordingly, for example, as illustrated in FIG. 17C, a drawn stroke image 1731 is added to the display screen 1710 presented on the display such as the display 160 of the electronic whiteboard 1a.

At Step S1512, the information transmission unit 16a of the electronic whiteboard 1a uses the data exchange unit 11a to transmit the stroke data generated at Step S1511 to the other electronic whiteboard 1b, which is communicating therewith, via the communication management device 5. Accordingly, the data exchange unit 51 of the communication management device 5 receives the stroke data transmitted from the electronic whiteboard 1a.

At Step S1513, the shared-information management unit 56 of the communication management device 5 stores the stroke data, received from the electronic whiteboard 1a, in the shared information 5006 in the storage unit 5000 in association with the session ID "se01" via the storing/reading processing unit 58.

At Step S1514, for example, the data exchange unit 51 of the communication management device 5 transfers (transmits) the stroke data, received from the electronic whiteboard 1a, to the other electronic whiteboard 1b communicating with the electronic whiteboard 1a in parallel with the process at Step S1513. Accordingly, the data exchange unit 11b of the electronic whiteboard 1b receives the stroke data that is transmitted from the electronic whiteboard 1a.

As described above, in the communication system 100 according to the present embodiment, the electronic whiteboard 1 may transmit the stroke data to the other electronic whiteboard 1 communicating with the electronic whiteboard 1 via the communication management device 5.

Figure 17D:
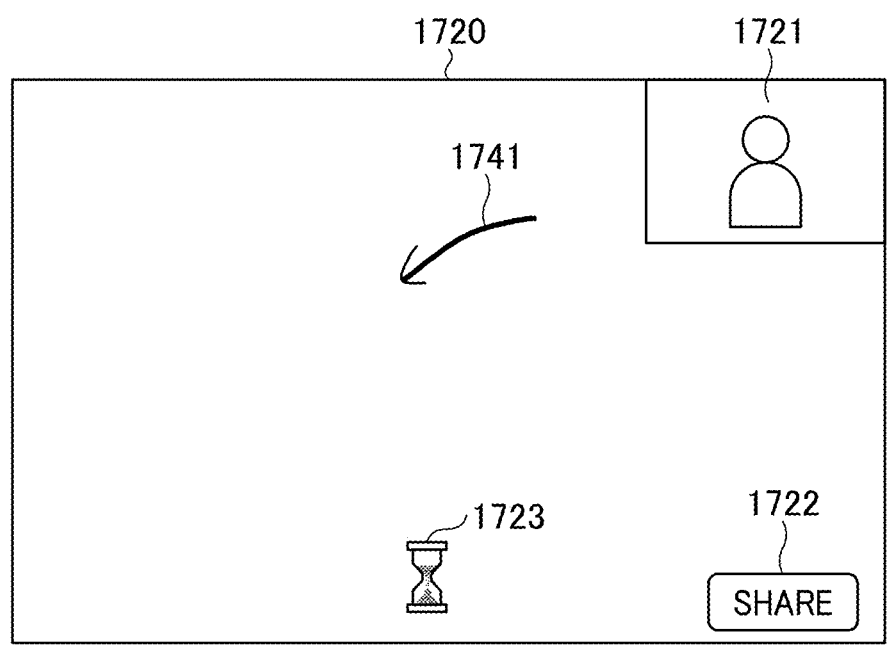

At Step S1515, the image processing unit 15b of the electronic whiteboard 1b generates the stroke image based on the stroke data received from the electronic whiteboard 1a. The display control unit 14b of the electronic whiteboard 1b causes the display such as the display 160 of the electronic whiteboard 1b to present the generated stroke image. Accordingly, for example, as illustrated in FIG. 17D, the display such as the display 160 of the electronic whiteboard 1b presents a stroke image 1741 that is similar to the stroke image 1731 presented by the electronic whiteboard 1a.

Subsequently, at Step S1601 of FIG. 16, the data exchange unit 71 of the image storage device 7 transmits, to the electronic whiteboard 1a, the completion notification indicating that the upload of the image data on the document image has been completed in parallel with, for example, the process from Steps S1510 to S1515 in FIG. 15. Accordingly, the data exchange unit 11a of the electronic whiteboard 1a receives the completion notification from the image storage device 7.

At Steps S1602 and S1603, the data exchange unit 11a of the electronic whiteboard 1a transmits the completion notification indicating that the upload of the image data on the document image has been completed to the other electronic whiteboard 1b, which is communicating therewith, via the communication management device 5. The completion notification includes, for example, the URL of the image data received at Step S1504. Here, the data exchange unit 51 of the communication management device 5 receives the completion notification transmitted from the electronic whiteboard 1a and transfers the completion notification to the other electronic whiteboard 1b communicating with the electronic whiteboard 1a. Accordingly, the data exchange unit 11b of the electronic whiteboard 1b receives the completion notification transmitted from the electronic whiteboard 1a.

At Step S1604, the data exchange unit 11b of the electronic whiteboard 1b transmits the request information indicating the request to download the image data on the document image to the URL, received at Step S1603, in the image storage device 7. Accordingly, the data exchange unit 71 of the image storage device 7 receives the request information from the electronic whiteboard 1b.

At Step S1605, the storing/reading processing unit 72 of the image storage device 7 reads the image data on the document image, which is the request target, from the storage unit 7000 based on the received URL. At Step S1606, the data exchange unit 71 of the image storage device 7 transmits the image data on the document image, which is the request target, to the electronic whiteboard 1b that is the requestor. Accordingly, the data exchange unit 11b of the electronic whiteboard 1b downloads (receives) the image data.

At Step S1607, the display control unit 14b of the electronic whiteboard 1b presents the downloaded image data on the display screen 1720 presented on the display such as the display 160 of the electronic whiteboard 1b. The display control unit 14b of the electronic whiteboard 1b hides the currently presented hourglass icon 1723.

Process to Change Display Order

The electronic whiteboard 1 defines a plurality of images such as stroke images by using X and Y coordinates on a two-dimensional plane of the display such as the display 160 and, for example, to share the stroke image with the other electronic whiteboard 1, transmits the stroke data including the X and Y coordinates.

Unfortunately, there is a disadvantage that, as it is difficult to indicate whether each image is in the front or back by using the X and Y coordinates, for example, there is a difficulty in changing the display order of shared images. For example, it is assumed that the shared images are sequentially presented, starting from an image A, an image B, and then an image C, on the display such as the display 160 of the electronic whiteboard 1a. In this case, according to a conventional technique, it is difficult to move the image A, which is presented in the background, to the foreground so as to sequentially present the images, starting from the image B, the image C, and then the image A.

In order to solve the above disadvantage, the electronic whiteboard 1 according to the present embodiment has the function to exchange the information regarding the display order of the plurality of images shared with the other electronic whiteboard 1. Thus, in the communication system 100 according to the present embodiment, for example, when the display order of the plurality of images shared by the electronic whiteboards 1a and 1b is changed in the electronic whiteboard 1a, the display order of the plurality of images is also changed in the electronic whiteboard 1b to the same display order as that of the electronic whiteboard 1a. The foreground refers to the side closest to the user when the user of the electronic whiteboard 1 faces the electronic whiteboard 1. The background refers to the side farthest from the user when the user of the electronic whiteboard 1 faces the electronic whiteboard 1.

First Embodiment

Shared Information

Figure 18:
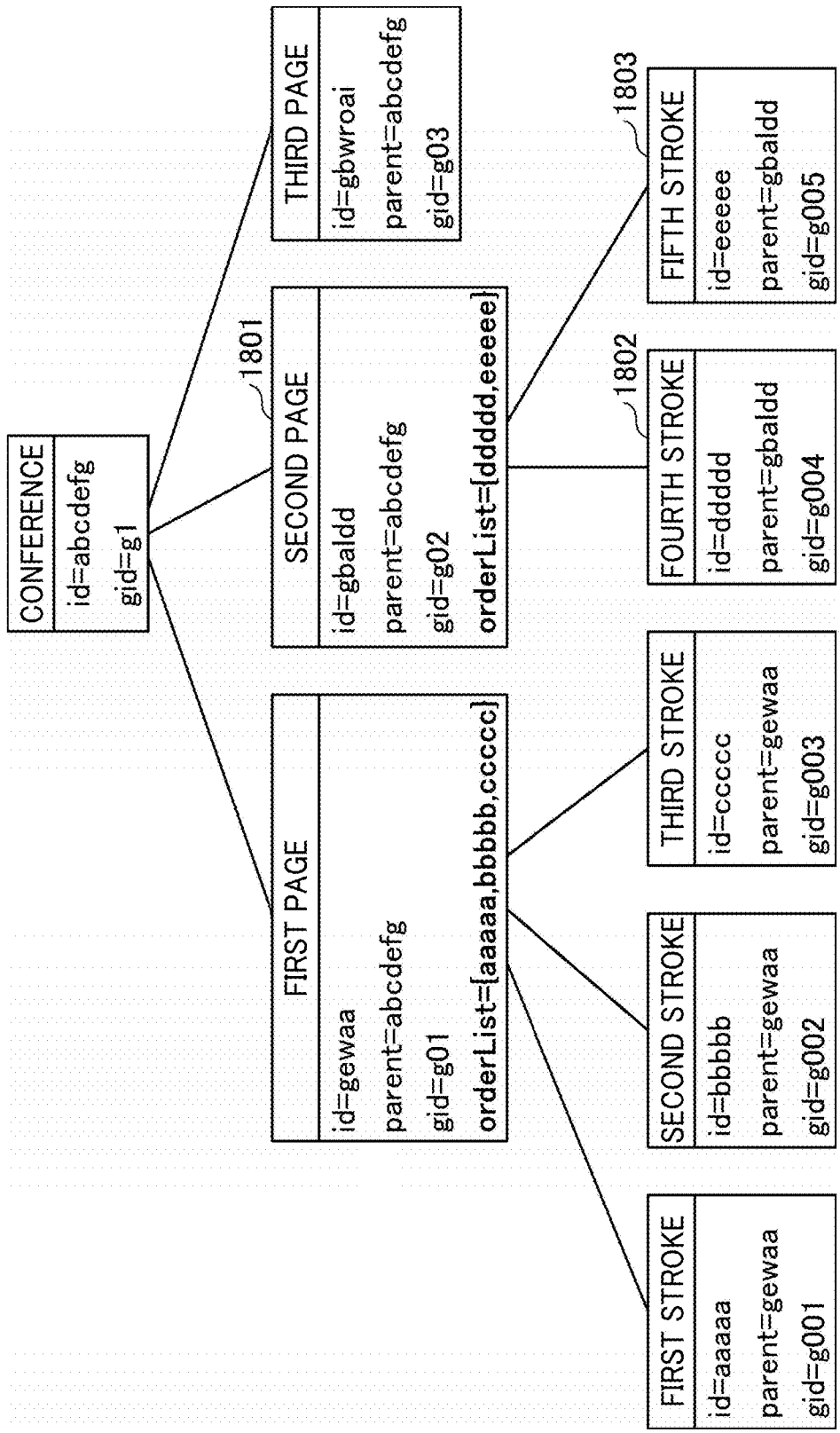
FIG. 18 is a schematic view illustrating shared information according to a first embodiment.

FIG. 18 is a schematic view illustrating shared information 1800 according to the first embodiment. In the communication system 100 according to the first embodiment, the information on the plurality of images shared between the electronic whiteboards 1a and 1b is managed as the shared information 1800 having the format illustrated in FIG. 18, for example.

For example, the shared-information management unit 56 of the communication management device 5 stores and manages the shared information having the format illustrated in FIG. 18 in the shared information 5006, or the like, of the storage unit 5000 for each conference (session).

Each of the electronic whiteboards 1a and 1b participating in the conference stores and manages the shared information having the format illustrated in FIG. 18 in the shared information 1001, or the like, of the storage unit 1000 of its own.

In the example of FIG. 18, the shared information 1800 has a hierarchical structure of "conference", "pages (a first page to a third page)", and "strokes (a first stroke to a fifth stroke)".

The "stroke" corresponds to the stroke data according to the present embodiment and is managed for each "page" as illustrated in FIG. 18, for example. For example, the first stroke includes the stroke ID (id=aaaaa) for identifying the first stroke, the information (parent=gewaa) for identifying the first page, which is a parent, and Gid "g001" for identifying drawing data. The first stroke may include, for example, the drawing data corresponding to the Gid "g001".

For example, when an operation for movement, or the like, is performed on the stroke image represented by the first stroke, the Gid "g001" for identifying drawing data, the drawing data corresponding to the Gid "g001", and the like, are updated although the stroke ID (id=aaaaa) is continuously used. The drawing data includes data for reproducing the first stroke. The drawing data includes, for example, coordinate data, line width data, line color data, or vector data.

The electronic whiteboard 1 enables page switching. The "page" corresponds to each page including a display page that is displayed by the electronic whiteboard 1. For example, the first page includes information such as the page ID (id=gewaa) for identifying the first page and the information (parent=abcdefg) for identifying the parent "conference". The first page may include, for example, the data on the document image to be displayed on the first page.

According to the first embodiment, the "page" includes the information of "orderList" indicating the display order of the plurality of images (e.g., stroke images) displayed on each page. For example, "orderList={aaaaa,bbbbb,ccccc}" included in the first page of FIG. 18 indicates that the first stroke to the third stroke are sequentially drawn, starting from the first stroke, the second stroke, and then the third stroke.

Therefore, for example, when the first stroke drawn in the background is to be drawn in the foreground, the information of "orderList" may be changed to "orderList={bbbbb, ccccc,aaaaa}".

The "conference" corresponds to the session (e.g., communication or conference) managed by the communication system 100. The "conference" is managed by using, for example, the session ID (id=abcdefg) for identifying the session.

For example, the image processing unit 15 of the electronic whiteboard 1 may use the first stroke to the third stroke to reproduce the plurality of stroke images drawn on the first page.

Process Flow

Figure 19:
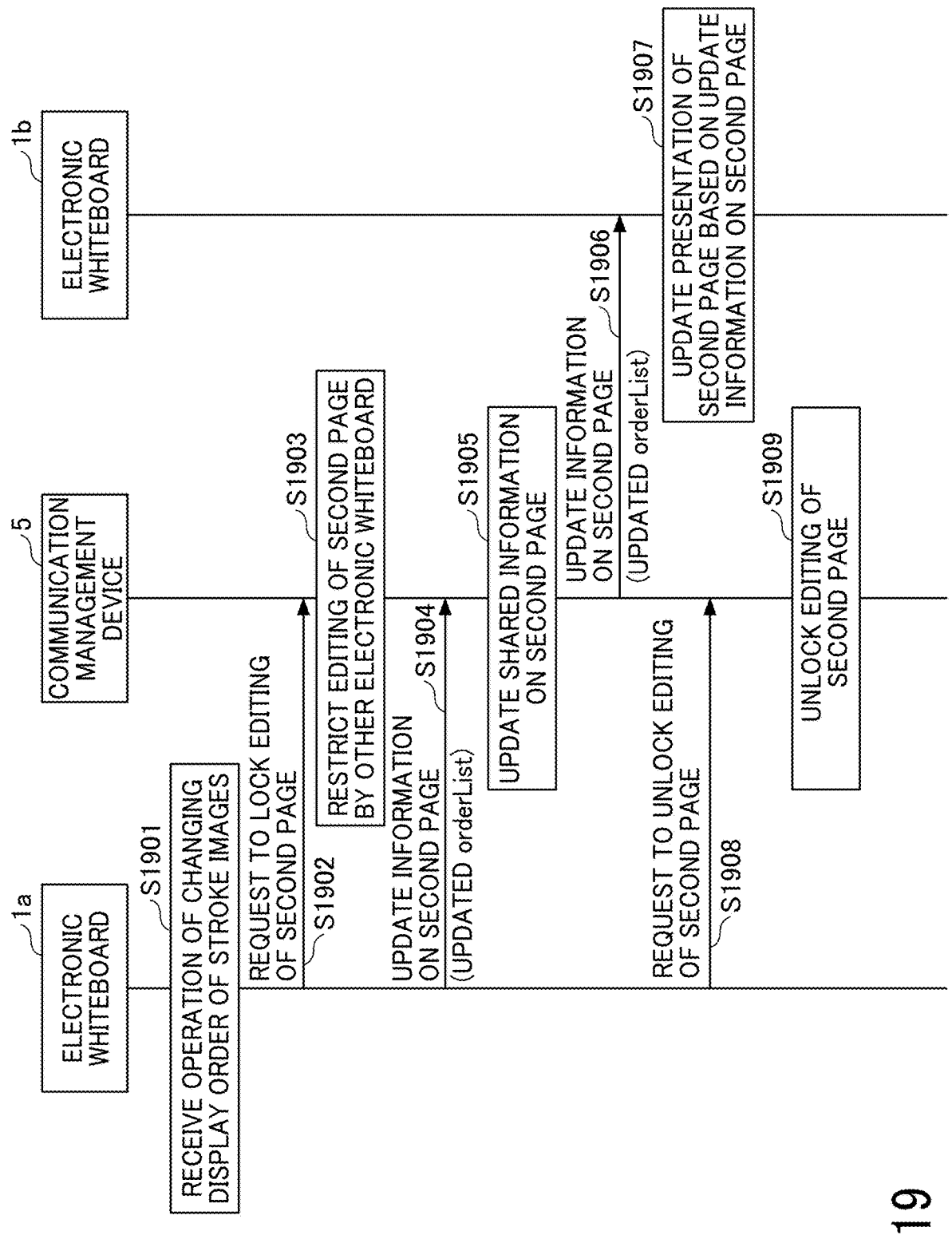
FIG. 19 is a sequence diagram illustrating an example of the process to change a display order according to the first embodiment.

FIG. 19 is a sequence diagram illustrating an example of the process to change the display order according to the first embodiment. It is assumed that, at the start of the process illustrated in FIG. 19, the electronic whiteboards 1a and 1b are participating in the same conference (session) by the session start process in FIG. 14, for example. Furthermore, it is assumed that the displays such as the displays 160 of the electronic whiteboards 1a and 1b sequentially present two stroke images, starting from a stroke image 2011 and then a stroke image 2012, as illustrated in FIG. 20A, for example.

At Step S1901, the reception unit 12a of the electronic whiteboard 1a receives the operation of changing the display order of the stroke images by the user A.

Figure 20A:
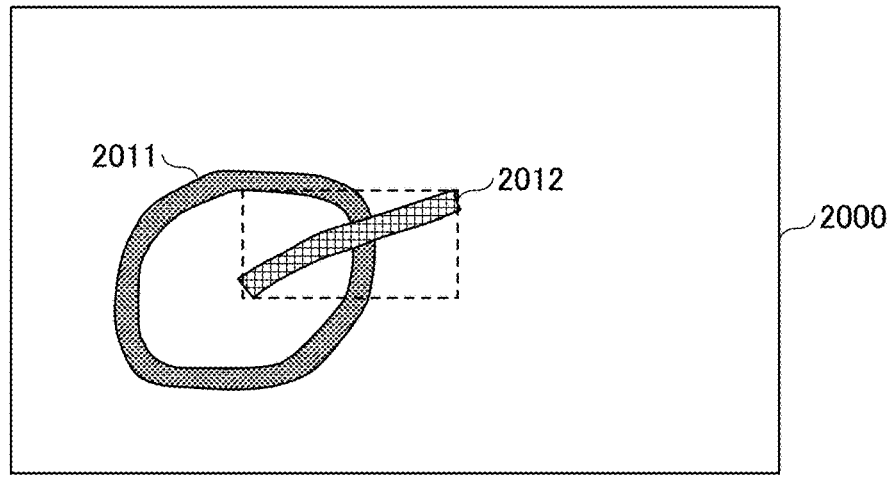
FIGS. 20A to 20C are diagrams illustrating an example of the operation to change a display order of stroke images according to the first embodiment.
Figure 20B:
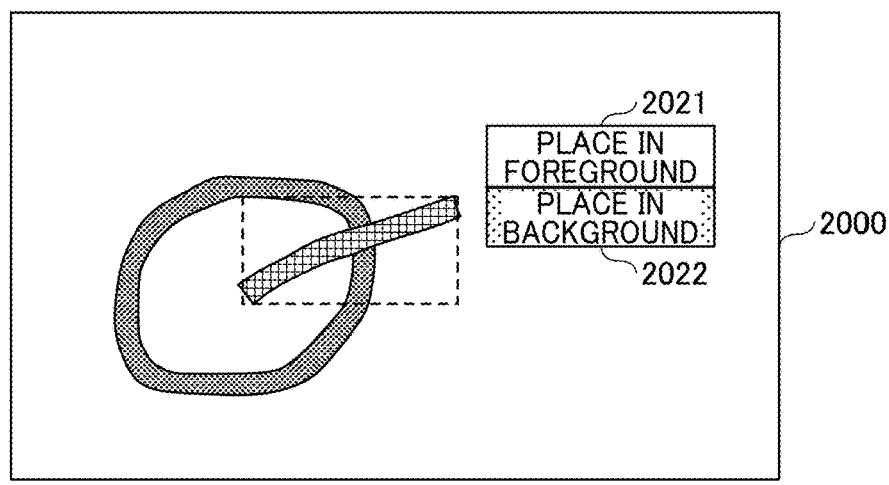

For example, it is assumed that, with regard to the stroke image 2011 and the stroke image 2012 presented on a display screen 2000 illustrated in FIG. 20A, the display order of the stroke image 2012 is changed. In this case, the user A selects the stroke image 2012, which is the target to be changed, with the electronic pen 140, the hand H, or the like, and performs a predetermined operation such as long pressing. Accordingly, as illustrated in FIG. 20B, for example, the display screen 2000 presents a menu 2021 for changing the display order of the stroke image 2012 that is the target to be changed. The user A selects, for example, "place in the background" 2022 from the menu 2021 so as to move the stroke image 2012 to the back side of the stroke image 2011 as illustrated in FIG. 20C.

Thus, for example, the information of "orderList" included in the "page" of the shared information 1800 illustrated in FIG. 18, for example, is updated. For example, it is assumed that the display screen 2000 in FIG. 20A corresponds to a "second page" 1801 of the shared information 1800 in FIG. 18, the stroke image 2011 corresponds to a "fourth stroke" 1802, and the stroke image 2012 corresponds to a "fifth stroke" 1803.

Figure 20C:
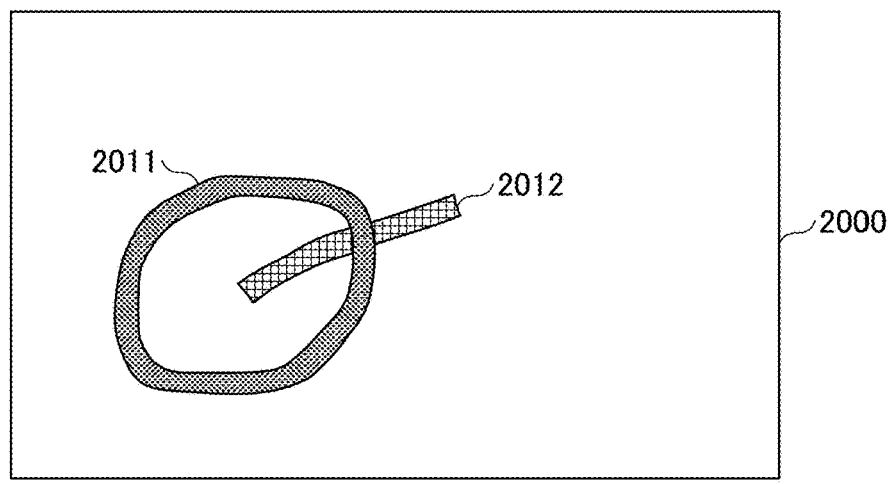

In this state, when the stroke image 2012 is moved to the back side of the stroke image 2011 as illustrated in FIG. 20C, "orderList={ddddd,eeeee}" of the "second page" 1801 is updated to "orderList={eeeee,ddddd}".

At Step S1902, the information transmission unit 16a of the electronic whiteboard 1a requests the communication management device 5 to lock the editing of the page (e.g., the second page) displayed by the electronic whiteboards 1a and 1b. This is because, for example, if the stroke image is updated, or the like, by the other electronic whiteboard 1b while the information on the second page is being updated, there is an operation conflict with the other electronic whiteboard 1b.

At Step S1903, the shared-information management unit 56 of the communication management device 5 restricts the update to the second page by the other electronic whiteboard 1b in response to the request from the electronic whiteboard 1a. Accordingly, the shared-information management unit 56 of the communication management device 5 rejects the update to the second page, the update to the stroke image, or the like, by the electronic whiteboard 1b, for example.

At Step S1904, the information transmission unit 16a of the electronic whiteboard 1a transmits the update information on the second page to the other electronic whiteboard 1b, which is communicating therewith, via the communication management device 5. The update information on the second page includes, for example, the updated orderList (e.g., orderList={eeeee,ddddd}).

At Step S1905, the shared-information management unit 56 of the communication management device 5 updates the shared information on the second page based on the update information on the second page received from the electronic whiteboard 1a. For example, the shared-information management unit 56 changes orderList included in the "second page" 1801 of the shared information 1800 illustrated in FIG. 18 to the updated orderList (e.g., orderList={eeeee, ddddd}).

At Step S1906, the data exchange unit 51 of the communication management device 5 transfers (transmits) the update information on the second page, received from the electronic whiteboard 1a, to the other electronic whiteboard 1b, which is communicating with the electronic whiteboard 1a, in parallel with for example the process at Step S1905.

At Step S1907, the display control unit 14b of the electronic whiteboard 1b uses the received update information (an example of the information regarding the display order of the plurality of images) on the second page to update the presentation of the plurality of images on the display such as the display 160 of the electronic whiteboard 1b. For example, the display control unit 14b of the electronic whiteboard 1b changes the display order of the "fourth stroke" 1802 and the "fifth stroke" 1803 on the display in accordance with the updated orderList included in the update information on the second page. Accordingly, the display of the electronic whiteboard 1b presents the display screen 2000 illustrated in FIG. 20C, for example, in the same manner as the display of the electronic whiteboard 1a.

At Step S1908, the information transmission unit 16a of the electronic whiteboard 1a requests the communication management device 5 to unlock the editing of the second page. Accordingly, at Step S1909, the shared-information management unit 56 of the communication management device 5 unlocks the editing of the second page.

In the communication system 100 in which the plurality of communication terminals (the electronic whiteboards 1) shares the plurality of images, the above-described process makes it possible to change the display order of the plurality of shared images (e.g., stroke images).

Second Embodiment

According to the first embodiment, when the display order of the plurality of images (e.g., stroke images) presented on the display of the electronic whiteboard 1a is changed, the display order of the plurality of images presented on the display of the electronic whiteboard 1b is also changed in the same manner.

According to this method, however, when the display order of the plurality of images is changed in the electronic whiteboard 1a, for example, the page information is changed. Furthermore, according to this method, there is an operation conflict when the stroke image is edited by another user while the page information is being updated, and therefore the editing of the page is locked as described at Step S1902 of FIG. 19, for example.

In a second embodiment, a description is given of an example of the case where the information (orderList) indicating the display order of the plurality of images and the page information are separately managed.

Shared Information

Figure 21:
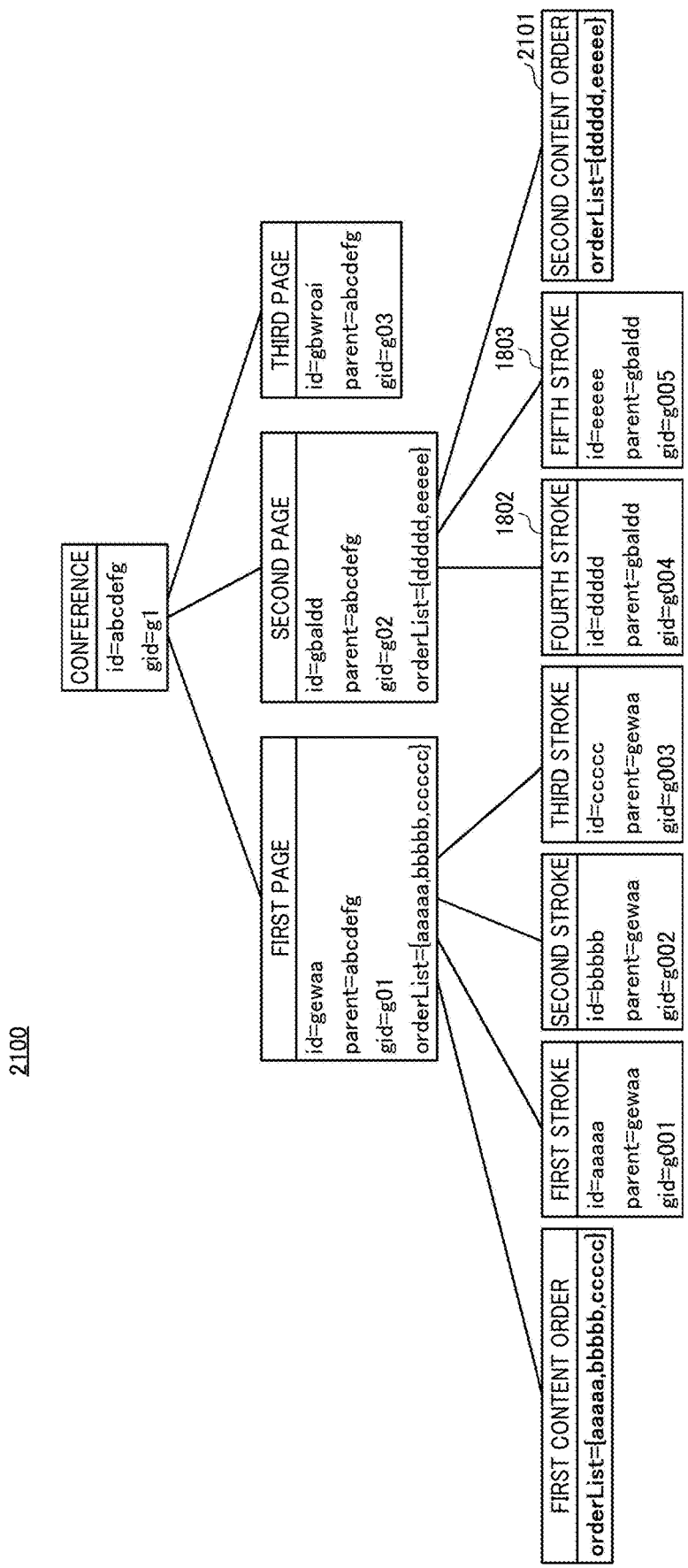
FIG. 21 is a schematic view illustrating shared information according to a second embodiment.

FIG. 21 is a schematic view illustrating shared information 2100 according to the second embodiment. In the communication system 100 according to the second embodiment, the information on the plurality of images shared between the electronic whiteboards 1a and 1b is managed as the shared information 2100 having the format illustrated in FIG. 21, for example.

For example, the shared-information management unit 56 of the communication management device 5 stores and manages the shared information having the format illustrated in FIG. 21, for example, in the shared information 5006, or the like, of the storage unit 5000 for each conference (session).

Each of the electronic whiteboards 1a and 1b participating in the conference stores and manages the shared information having the format illustrated in FIG. 21 in the shared information 1001, or the like, of the storage unit 1000 of its own.

Although the information of "orderList" indicating the display order of the plurality of images is included in "page" according to the first embodiment, the information of "orderList" is managed as "content order" (a first content order and a second content order) separately from "page" according to the second embodiment. Thus, according to the second embodiment, for example, when the display order of the plurality of images presented on the display of the electronic whiteboard 1a is changed, the information of "content order" may be changed without changing the information of "page".

Process Flow

Figure 22:
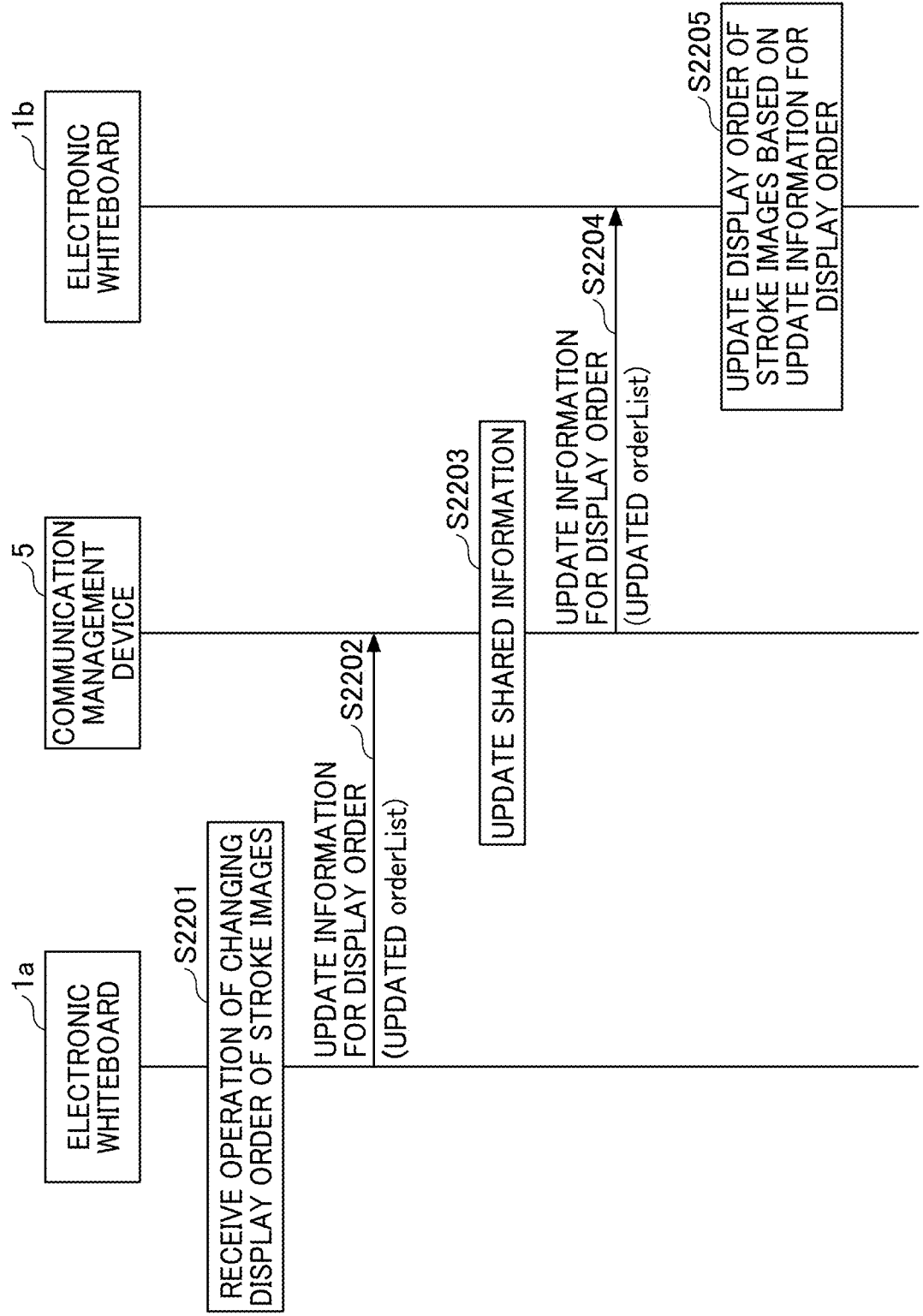
FIG. 22 is a sequence diagram illustrating an example of the process to change the display order according to the second embodiment.

FIG. 22 is a sequence diagram illustrating an example of the process to change the display order according to the second embodiment. It is assumed that, at the start of the process illustrated in FIG. 22, the electronic whiteboards 1a and 1b are participating in the same session (e.g., conference or communication) by the session start process in FIG. 14, for example. Furthermore, it is assumed that the displays such as the displays 160 of the electronic whiteboards 1a and 1b sequentially present two stroke images, starting from the stroke image 2011 and then the stroke image 2012, as illustrated in FIG. 20A, for example.

At Step S2201, the reception unit 12a of the electronic whiteboard 1a receives the operation of changing the display order of the stroke images by the user A in the same manner as in the first embodiment.

At Step S2202, the information transmission unit 16a of the electronic whiteboard 1a transmits the update information for the display order to the other electronic whiteboard 1b, which is communicating therewith, via the communication management device 5. For example, the information transmission unit 16a of the electronic whiteboard 1a transmits the "second content order" 2101 of FIG. 21 to the other electronic whiteboard 1b communicating therewith. The update information for the display order includes the updated orderList (e.g., orderList={eeeee,ddddd}).

At Step S2203, the shared-information management unit 56 of the communication management device 5 updates the shared information 5006 stored in the storage unit 5000 based on the update information for the display order received from the electronic whiteboard 1a. For example, the shared-information management unit 56 updates orderList included in the "second content order" 2101 of the shared information 2100 illustrated in FIG. 21 to the updated orderList (e.g., orderList={eeeee,ddddd}).

At Step S2204, the data exchange unit 51 of the communication management device 5 transfers (transmits) the update information for the display order received from the electronic whiteboard 1a to the other electronic whiteboard 1b, which is communicating with the electronic whiteboard 1a, in parallel with, for example, the process at Step S2203.

At Step S2205, the display control unit 14b of the electronic whiteboard 1b changes the display order of the plurality of images presented on the display such as the display 160 of the electronic whiteboard 1b based on the received update information for the display order (another example of the information regarding the display order of the plurality of images). For example, the display control unit 14b of the electronic whiteboard 1b changes the display order of the "fourth stroke" 1802 and the "fifth stroke" 1803 presented on the display in accordance with the updated orderList included in the update information for the display order. Accordingly, the display of the electronic whiteboard 1b also presents the plurality of shared images in the same order as that for the display of the electronic whiteboard 1a.

As described above, according to the second embodiment, the page information is not changed when the display order of the plurality of images shared by the electronic whiteboards 1a and 1b is changed, and therefore the display order of the plurality of images may be changed without performing the locking process to prohibit the editing under the "page".

Process To Update Display Order

FIG. 23 is a flowchart illustrating an example of the process to update the display order according to an embodiment. This process is an example of the process performed by the display control unit 14 of the electronic whiteboard 1b to update the display order of the plurality of images at Step S2205 of FIG. 22. This process is also applicable to, for example, the process at Step S1907 of FIG. 19.

When the electronic whiteboard 1b receives the information regarding the display order of the plurality of images shared with the electronic whiteboard 1a at Step S2301, the process after Step S2302 is performed. The information regarding the display order of the plurality of images includes, for example, the update information for the display order including "orderList" (the second embodiment) or the page information including "orderList" (the first embodiment).

At Step S2302, the display control unit 14b of the electronic whiteboard 1b determines whether an image overlapped with another image, included in the plurality of images shared with the electronic whiteboard 1a, is a stroke image. When the overlapped images are not stroke images, the display control unit 14b of the electronic whiteboard 1b proceeds to the process at Step S2303. Conversely, when the overlapped images are stroke images, the display control unit 14b of the electronic whiteboard 1b proceeds to the process at Step S2304.

When the process proceeds to Step S2303, the display control unit 14b of the electronic whiteboard 1b updates the display order of the plurality of images shared with the electronic whiteboard 1a in accordance with the information regarding the display order of the plurality of images. For example, the display control unit 14b of the electronic whiteboard 1b redraws the plurality of images shared with the electronic whiteboard 1a in the display order indicated by "orderList".

Conversely, when the process proceeds to Step S2304, the display control unit 14b of the electronic whiteboard 1b determines whether the overlapped stroke images are in the identical color. When the overlapped stroke images are not in the identical color, the display control unit 14b of the electronic whiteboard 1b proceeds to the process at Step S2303. Conversely, when the overlapped stroke images are in the identical color, the display control unit 14b of the electronic whiteboard 1b proceeds to the process at Step S2305.

When the process proceeds to Step S2305, the display control unit 14b of the electronic whiteboard 1b cancels the process of updating the display order of the plurality of images shared with the electronic whiteboard 1a. As described above, when the overlapped images are stroke images and are in the identical color, the display control unit 14b of the electronic whiteboard 1b may determine that the display order of the plurality of images is not to be changed as the appearance remains the same even if the display order is changed.

There is a disadvantage of a high processing load due to redrawing of all the images in accordance with the page information and the update information for the display order. The above-described process may reduce the processing load of the electronic whiteboard 1b as redrawing is executed as appropriate.

The above process is an example, and it is appropriate as long as the display control unit 14b of the electronic whiteboard 1b determines whether the display order of the plurality of images is to be changed and, when it is determined that the display order is not to be changed, cancels the change of the display order of the plurality of images. The process in FIG. 23 is optionally executed.

According to each of the embodiments of the present invention, in the communication system 100 in which the plurality of images is shared by the plurality of communication terminals (the electronic whiteboards 1a and 1b), the display order of the plurality of shared images may be changed.

Each of the functions according to the embodiments described above may be implemented by one or more processing circuits. In this description, the "processing circuit" includes a programmed processor to perform each function by software, such as a processor implemented by an electronic circuit. The "processing circuit" also includes devices such as an application specific integrated circuit (ASIC), a digital signal processor (DSP), a field programmable gate array (FPGA), and conventional circuit modules designed to perform each of the functions described above.

In the description according to each of the above embodiments, it is assumed that the communication terminal is the electronic whiteboard 1, but examples of the communication terminal may include an information terminal having a communication function, such as a PC, a smartphone, or a tablet terminal that executes an application compatible with the communication system 100. Examples of the communication terminal may include various electronic devices having a communication function and a display function, such as a projector, a video-conferencing device, a digital signage, a medical device, and a car navigation device compatible with the communication system 100.

For example, programs of the electronic whiteboard 1 and the communication management device 5 may be distributed by being recorded in a computer-readable recording medium in a form of file installable or executable. For example, programs of the electronic whiteboard 1 and the communication management device 5 may be, instead of being in a recording medium, downloaded from a server (cloud or on-premise) and installed in a communication terminal.

The communication management device 5 may be implemented by not only the computer 400 illustrated in FIG. 4 but also an electronic device such as a mobile phone, a smartphone, a tablet terminal, a wearable terminal, a Personal Digital Assistant (PDA), or an image forming apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

According to an embodiment, a communication terminal that communicates with other communication terminal to share a plurality of images with the other communication terminal is provided. The communication terminal includes: a reception unit that receives a change of a display order of the plurality of images displayed on a display of the communication terminal; and an information transmission unit that transmits information regarding the changed display order of the plurality of images, to the other communication terminal, which causes the other communication terminal to change the display order of the plurality of images displayed on a display of the other communication terminal.

The communication terminal further includes a display control unit that, when the information regarding the display order of the plurality of images is received from the other communication terminal, changes the display order of the plurality of images displayed on the display of the communication terminal in accordance with the received information regarding the display order of the plurality of images.

Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a low-resolution video data serves such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium may also include a storage medium for storing processor readable code such as a floppy disk, a hard disk, a compact disc read-only memory (CD-ROM), a magnetic tape device, or a solid state memory device.

The invention claimed is:

1. A communication system comprising:
   a first communication terminal; and
   a second communication terminal configured to share a plurality of images with the first communication terminal,
   the first communication terminal including first circuitry configured to:
   receive a change of a display order of the plurality of images displayed on a display of the first communication terminal; and
   transmit information regarding the changed display order of the plurality of images to the second communication terminal, and
   the second communication terminal including second circuitry configured to change the display order of the plurality of images displayed on a display of the second communication terminal in accordance with the information regarding the display order of the plurality of images received from the first communication terminal,
   wherein the plurality of images includes a stroke image drawn by a user of the first communication terminal or a user of the second communication terminal, and
   when overlapped images, included in the plurality of images, are stroke images and are in an identical color, the second circuitry controls not to change the display order of the plurality of images.

2. The communication system of claim 1, wherein the first communication terminal further includes a memory that stores info!' cation on one or more pages including a display page currently displayed on the display of the first communication terminal, wherein
   in response to reception of the change of the display order of the plurality of images, the first circuitry transmits, to the second communication terminal, information on the display page obtained from the memory, the information on the display page including the information indicating the display order of the plurality of images.

3. The communication system of claim 1, wherein the first communication terminal further includes a memory that stores, for each page displayed on the display of the first communication terminal, information on the plurality of images and information indicating the display order of the plurality of images, wherein
   in response to reception of the change of the display order of the plurality of images, the first circuitry transmits, to the second communication terminal, the information indicating the display order of the plurality of images corresponding to a display page currently displayed on the display of the first communication terminal.

4. The communication system of claim 1, wherein the second circuitry further determines whether to change the display order of the plurality of images, and
   when based on a determination that the display order of the plurality of images is not to be changed based on information on the stroke image and information regarding the display order, the second circuitry controls not to change the display order of the plurality of images.

5. The communication system of claim 1, further comprising a communication management device configured to control a communication between the first communication terminal and the second communication terminal, wherein
   the communication management device (5) includes third circuitry configured to transfer, to the second communication teiiiiiinal, the information regarding the display order of the plurality of images transmitted from the first communication terminal, and
   the first circuitry of the first communication terminal transmits the information regarding the display order of the plurality of images to the second communication terminal via the communication management device.

6. A method for communicating with other communication terminal to share a plurality of images with the other communication terminal, performed by a communication terminal, the method comprising:
   receiving a change of a display order of the plurality of images displayed on a display of the communication terminal; and
   transmitting information reuarding the changed display order of the plurality of images received at the receiving to the other communication terminal, to cause the other communication terminal to change the display order of the plurality of images displayed on a display of the other communication terminal,
   wherein the plurality of images includes a stroke image drawn by a user of the communication terminal or a user of the other communication terminal, and
   the method further comprising:
   determining whether overlapped images. included in the plurality of images, are stroke images and are in an identical color; and
   based on a determination that the overlapped images are stroke images and are in an identical color, controlling not to change the display order of the plurality of images.

7. The method of claim 6, further comprising:
   storing, in a memory, information on one or more pages including a display page currently displayed on the display of the communication terminal; and
   in response to reception of the change of the display order of the plurality of images, transmitting, to the other communication terminal, information on the display page obtained from the memory, the information on the display page including the information indicating the display order of the plurality of images.

8. The method of claim 6, further comprising:
   storing, in a memory, for each page displayed on the display of the communication terminal, information on the plurality of images and information indicating the display order of the plurality of images; and
   in response to reception of the change of the display order of the plurality of images, transmitting, to the other communication terminal, the information indicating the display order of the plurality of images corresponding to a display page currently displayed on the display of the communication terminal.

9. The method of claim 6, further comprising:
in response to reception of infolliiation regarding other display order of the plurality of images received from the other communication terminal, determining whether to change the display order of the plurality of images displayed on the display of the communication terminal; and
when the determining determines that the display order of the plurality of images is not to be changed based on information on the stroke image and information regarding the display order, controlling not to change the display order of the plurality of images.

10. The method of claim 6, wherein the transmitting includes transmitting the information regarding the changed display order of the plurality of images to the other communication terminal via a communication management device.

11. A non-transitory recording medium which, when executed by one or more processors, cause the processors to perform a method for communicating with other communication terminal to share a plurality of images with the other communication terminal, performed by a communication terminal, the method comprising:

receiving a change of a display order of the plurality of images displayed on a display of the communication terminal; and transmitting information regarding the changed display order of the plurality of images received at the receiving to the other communication terminal, to cause the other communication terminal to change the display order of the plurality of images displayed on a display of the other communication terminal, wherein the plurality of images includes a stroke image drawn by a user of the communication terminal or a user of the other communication terminal, and the method further comprising:

determining whether overlapped images, included in the plurality of images, are stroke images and are in an identical color; and based on a determination that the overlapped images are stroke images and are in an identical color, controlling not to change the display order of the plurality of images.

* * * * *